US011785536B2

(12) United States Patent
Papasakellariou

(10) Patent No.: US 11,785,536 B2
(45) Date of Patent: Oct. 10, 2023

(54) SCHEDULING FOR A UE CAPABLE OF RECEPTIONS OVER MULTIPLE ANTENNA PANELS

(71) Applicant: Samsung Electronics Co., Ltd., Suwon-si (KR)

(72) Inventor: Aris Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/645,955

(22) Filed: Dec. 23, 2021

(65) Prior Publication Data

US 2022/0217621 A1 Jul. 7, 2022

Related U.S. Application Data

(60) Provisional application No. 63/133,614, filed on Jan. 4, 2021.

(51) Int. Cl.
| *H04W 48/16* | (2009.01) |
| *H04W 24/10* | (2009.01) |
| *H04W 28/02* | (2009.01) |
| *H04W 72/23* | (2023.01) |

(52) U.S. Cl.
CPC ........... *H04W 48/16* (2013.01); *H04W 24/10* (2013.01); *H04W 28/0215* (2013.01); *H04W 72/23* (2023.01)

(58) Field of Classification Search
CPC ..... H04W 48/16; H04W 72/23; H04W 24/10; H04W 28/0215
See application file for complete search history.

(56) References Cited

U.S. PATENT DOCUMENTS

| 2020/0229008 | A1 | 7/2020 | Islam et al. | |
| 2020/0336928 | A1 | 10/2020 | Seo et al. | |
| 2021/0360667 | A1* | 11/2021 | Moon | H04W 72/23 |
| 2022/0217694 | A1* | 7/2022 | Kim | H04B 7/0626 |

OTHER PUBLICATIONS

"5G; NR; Physical channelsand modulation (3GPP TS 38.211 version 16.3.0 Release 16)", ETSI TS 138 211 V16.3.0, Nov. 2020, 136 pages.

(Continued)

*Primary Examiner* — Ronald B Abelson

(57) ABSTRACT

Apparatuses and methods for scheduling for a user equipment (UE) capable of receptions over multiple antenna panels. A method for a UE includes receiving information for first search space sets and for first CORESETs on first cells. The method further includes determining second search space sets, from the first search space sets, associated with time-overlapping PDCCH receptions in second CORESETs, from the first CORESETs, on second cells from the first cells; and receiving PDCCHs according to CSS sets or USS sets, from the second search space sets, only in: (a) a first CORESET with a first TCI state, and (b) if any, a second CORESET with a second TCI state different than the first TCI state, and (c) in any other CORESET from the second CORESETs with a TCI state that is same as the first TCI state or as the second TCI state.

20 Claims, 10 Drawing Sheets

(56) References Cited

OTHER PUBLICATIONS

"5G; NR; Multiplexing and channel coding (3GPP TS 38.212 version 16.3.0 Release 16)", ETSI TS 138 212 V16.3.0, Nov. 2020, 155 pages.
"5G; NR; Physical layer procedures for control (3GPP TS 38.213 version 16.3.0 Release 16)", ETSI TS 138 213 V16.3.0, Nov. 2020, 181 pages.
"5G; NR; Physical layer procedures for data (3GPP TS 38.214 version 16.3.0 Release 16)", ETSI TS 138 214 V16.3.0, Nov. 2020, 169 pages.
"5G; NR; Medium Access Control (MAC) protocol specification (3GPP TS 38.321 version 16.2.1 Release 16)", ETSI TS 138 321 V16.2.1, Nov. 2020, 156 pages.
"5G; NR; Radio Resource Control (RRC); Protocol specification (3GPP TS 38.331 version 16.2.0 Release 16)", ETSI TS 138 331 V16.2.0, Nov. 2020, 908 pages.
International Search Report and Written Opinion dated Apr. 21, 2022 regarding Application No. PCT/KR2022/000082, 6 pages.
Iterdigital, Inc., "Reliability Enhancements for PDCCH, PUCCH, and PUSCH", 3GPP TSG RAN WG1 #103-e, R1-2007627, Oct. 2020, 7 pages.
Qualcomm Incorporated., "Enhancements on Multi-TRP for PDCCH, PUCCH and PUSCH", 3GPP TSG RAN WG1 #103-e, R1-2009251, Oct. 2020, 33 pages.
MediaTek Inc., "Enhancements on Multi-TRP for PDCCH, PUCCH and PUSCH", 3GPP TSG RAN WG1 #103-e, R1-2008958, Oct. 2020, 14 pages.

\* cited by examiner ical field.

SCHEDULING FOR A UE CAPABLE OF RECEPTIONS OVER MULTIPLE ANTENNA PANELS

CROSS-REFERENCE TO RELATED APPLICATION AND CLAIM OF PRIORITY

This application claims priority under 35 U.S.C. § 119(e) to U.S. Provisional Patent Application No. 63/133,614 filed on Jan. 4, 2021. The above-identified provisional patent application is hereby incorporated by reference in its entirety.

TECHNICAL FIELD

The present disclosure relates generally to wireless communication systems and, more specifically, the present disclosure relates to scheduling for a user equipment (UE) capable of receptions over multiple antenna panels.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure relates to scheduling for a UE capable of receptions over multiple antenna panels.

In one embodiment, a method for a UE is provided. The method includes receiving information for first search space sets and for first control resource sets (CORESETs) on first cells. A search space set has an index, is a common search space set (CSS set) or a UE-specific search space set (USS set), and is associated with a CORESET having an index and a transmission configuration indicator (TCI) state. The method further includes determining second search space sets, from the first search space sets, associated with time-overlapping PDCCH receptions in second CORESETs, from the first CORESETs, on second cells from the first cells; and receiving physical downlink control channels (PDCCHs) according to CSS sets or USS sets, from the second search space sets, only in: (a) a first CORESET with a first TCI state, and (b) if any, a second CORESET with a second TCI state different than the first TCI state, and (c) in any other CORESET from the second CORESETs with a TCI state that is same as the first TCI state or as the second TCI state. The first CORESET corresponds to a first CSS set with a lowest index on a first cell with a lowest index from the second cells, if any; otherwise, to a first USS set with a lowest index on the first cell with the lowest index from the second cells. Excluding CSS sets and USS sets associated with CORESETs having the first TCI state, the second CORESET corresponds to a second CSS set with a lowest index on a second cell with a lowest index from the second cells, if any; otherwise, to a second USS set with a lowest index in the second cell with the lowest index from the second cells.

In another embodiment, a UE is provided. The UE includes a transceiver configured to receive information for first search space sets and for first CORESETs on first cells. A search space set has an index, is a CSS set or a USS set, and is associated with a CORESET having an index and a TCI state. The UE further includes a processor operably coupled to the transceiver. The processor is configured to determine second search space sets, from the first search space sets, associated with time-overlapping receptions of physical downlink control channels (PDCCHs) in second CORESETs, from the first CORESETs, on second cells from the first cells. The transceiver is further configured to receive PDCCHs according to CSS sets or USS sets, from the second search space sets, only in: (a) a first CORESET with a first TCI state, and (b) if any, a second CORESET with a second TCI state different than the first TCI state, and (c) in any other CORESET from the second CORESETs with a TCI state that is same as the first TCI state or as the second TCI state. The first CORESET corresponds to a first CSS set with a lowest index on a first cell with a lowest index from the second cells, if any; otherwise, to a first USS set with a lowest index on the first cell with the lowest index from the second cells. Excluding CSS sets and USS sets associated with CORESETs having the first TCI state, the second CORESET corresponds to a second CSS set with a lowest index on a second cell with a lowest index from the second cells, if any; otherwise, to a second USS set with a lowest index in the second cell with the lowest index from the second cells.

In yet another embodiment, a base station is provided. The base station includes a transceiver configured to transmit information for first search space sets and for first CORESETs on first cells. A search space set has an index, is a CSS set or a USS set, and is associated with a CORESET having an index and a TCI state. The base station further includes a processor operably coupled to the transceiver, the processor is configured to determine second search space sets, from the first search space sets, associated with time-overlapping receptions of PDCCHs in second CORESETs, from the first CORESETs, on second cells from the first cells. The transceiver is further configured to transmit PDCCHs according to CSS sets or USS sets, from the second search space sets, only in: (a) a first CORESET with a first TCI state, and (b) if any, a second CORESET with a second TCI state different than the first TCI state, and (c) in any other CORESET from the second CORESETs with a TCI state that is same as the first TCI state or as the second TCI state. The first CORESET corresponds to a first CSS set with a lowest index on a first cell with a lowest index from the second cells, if any; otherwise, to a first USS set with a lowest index on the first cell with the lowest index from the second cells. Excluding CSS sets and USS sets associated with CORESETs having the first TCI state, the second CORESET corresponds to a second CSS set with a lowest index on a second cell with a lowest index from the second cells, if any; otherwise, to a second USS set with a lowest index in the second cell with the lowest index from the second cells.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
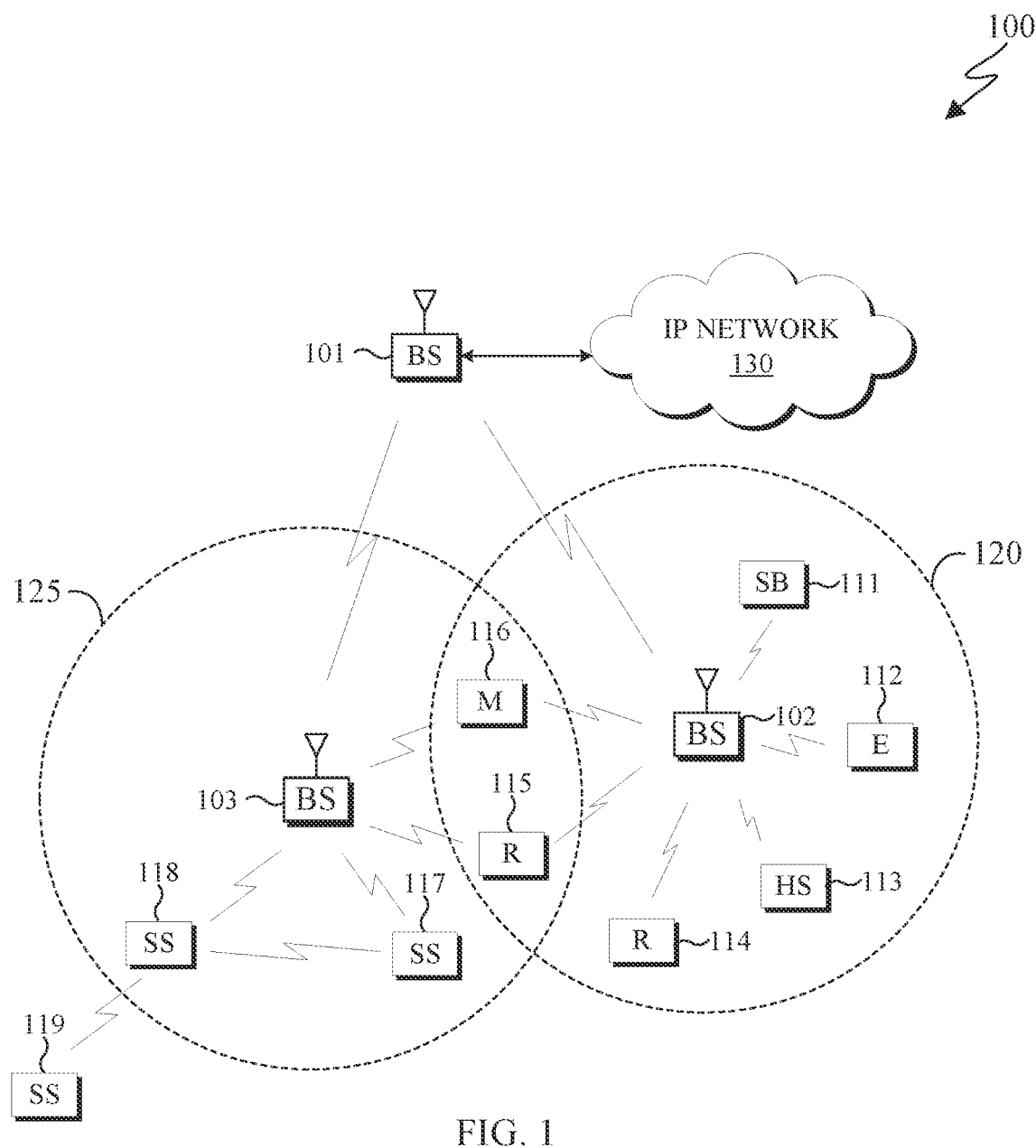
FIG. 1 illustrates an example wireless network according to embodiments of the present disclosure.

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

The following documents are hereby incorporated by reference into the present disclosure as if fully set forth herein:

[1] 3GPP TS 38.211 v16.3.0, "NR; Physical channels and modulation;"

[2] 3GPP TS 38.212 v16.3.0, "NR; Multiplexing and Channel coding;"

[3] 3GPP TS 38.213 v16.3.0, "NR; Physical Layer Procedures for Control;"

[3] 3GPP TS 38.214 v16.3.0, "NR; Physical Layer Procedures for Data;"

[5] 3GPP TS 38.321 v16.2.1, "NR; Medium Access Control (MAC) protocol specification;" and

[6] 3GPP TS 38.331 v16.2.0, "NR; Radio Resource Control (RRC) Protocol Specification."

To meet the demand for wireless data traffic having increased since deployment of the fourth generation (4G) communication systems, efforts have been made to develop and deploy an improved 5th generation (5G) or pre-5G/NR communication system. Therefore, the 5G or pre-5G communication system is also called a "beyond 4G network" or a "post long term evolution (LTE) system."

The 5G communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Depending on the network type, the term 'base station' (BS) can refer to any component (or collection of components) configured to provide wireless access to a network, such as transmit point (TP), transmit-receive point (TRP), an enhanced base station (eNodeB or eNB), a gNB, a macrocell, a femtocell, a WiFi access point (AP), a satellite, or other wirelessly enabled devices. Base stations may provide wireless access in accordance with one or more wireless communication protocols, e.g., 5G 3GPP New Radio Interface/Access (NR), LTE, LTE advanced (LTE-A), High Speed Packet Access (HSPA), Wi-Fi 802.11a/b/g/n/ac, etc. The terms 'BS,' 'gNB,' and 'TRP' can be used interchangeably in this disclosure to refer to network infrastructure components that provide wireless access to remote terminals. Also, depending on the network type, the term 'user equipment' (UE) can refer to any component such as mobile station, subscriber station, remote terminal, wireless terminal, receive point, vehicle, or user device. For example, a UE could be a mobile telephone, a smartphone, a monitoring device, an alarm device, a fleet management device, an asset tracking device, an automobile, a desktop computer, an entertainment device, an infotainment device, a vending machine, an electricity meter, a water meter, a gas meter, a security device, a sensor device, an appliance, and the like. The UE can be a mobile device or a stationary device. The term UE can refer to a remote wireless equipment that wirelessly accesses the BS. The UE can also be a car, truck, van, drone, or any other similar machine or a device in such machines.

Figure 2:
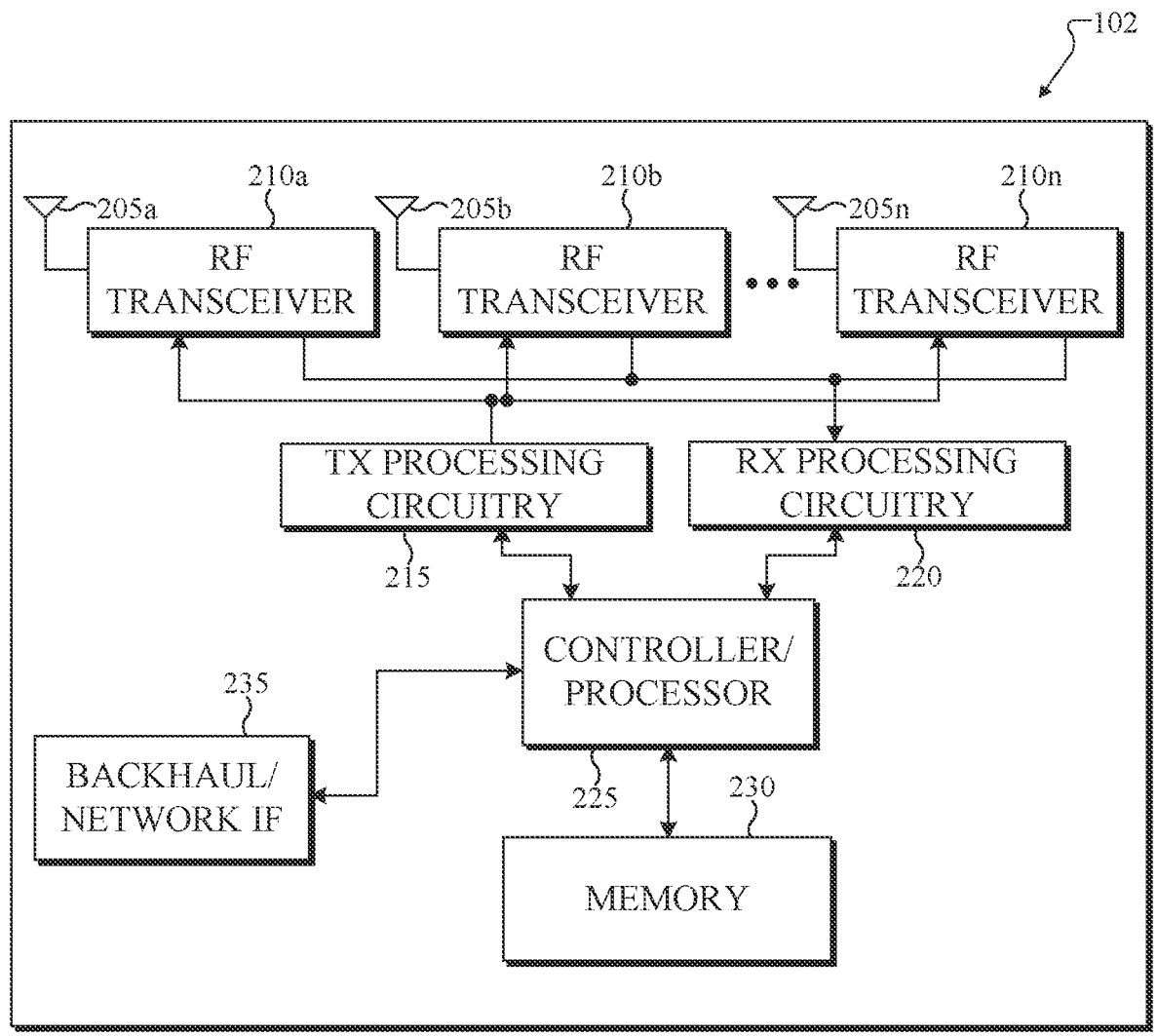
FIG. 2 illustrates an example base station (BS) according to embodiments of the present disclosure.
Figure 3:
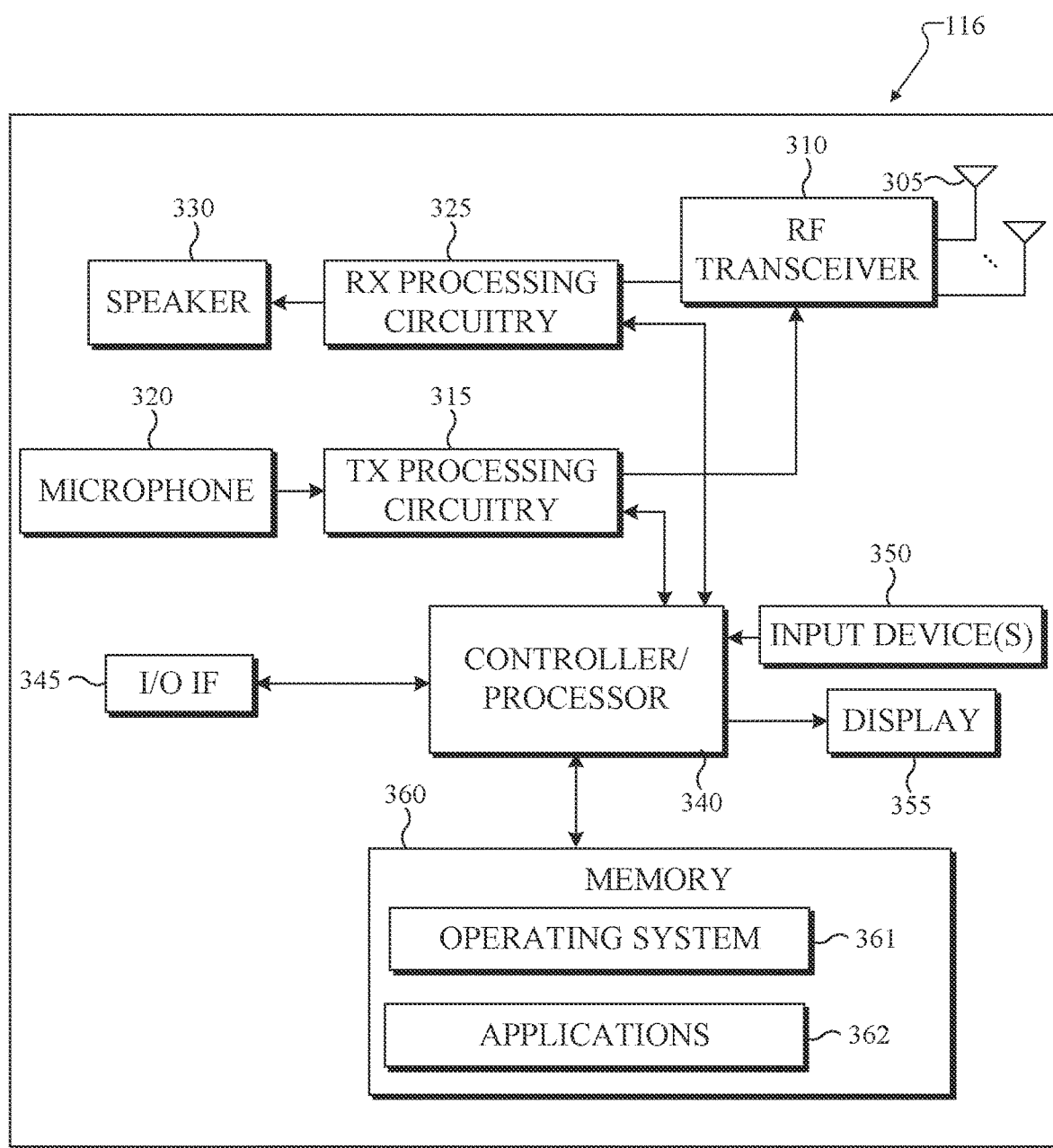
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes a base station, BS 101 (e.g., gNB), a BS 102, and a BS 103. The BS 101 communicates with the BS 102 and the BS 103. The BS 101 also communicates with at least one network 130, such as the Internet, a proprietary Internet Protocol (IP) network, or other data network.

The BS 102 provides wireless broadband access to the network 130 for a first plurality of user equipment's (UEs) within a coverage area 120 of the BS 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The BS 103 provides wireless broadband access to the network 130 for a second plurality of UEs within a coverage area 125 of the BS 103. The second plurality of UEs includes the UE 115, the UE 116, the UE 117, and the UE 118. In some embodiments, one or more of the BSs 101-103 may communicate with each other and with the UEs 111-118 using 5G/NR, long term evolution (LTE), long term evolution-advanced (LTE-A), WiMAX, WiFi, or other wireless communication techniques.

In certain embodiments, multiple UEs (such as the UE 117, the UE 118, and the UE 119) may communicate directly with each other through device-2-device communication. In some embodiments, a UE, such as UE 119, is outside the coverage area of the network, but can communicate with other UEs inside the coverage area of the network, such as UE 118, or outside the coverage area of the network.

Dotted lines show the approximate extents of the coverage areas 120 and 125, which are shown as approximately circular for the purposes of illustration and explanation only. It should be clearly understood that the coverage areas associated with BSs, such as the coverage areas 120 and 125, may have other shapes, including irregular shapes, depending upon the configuration of the BSs and variations in the radio environment associated with natural and man-made obstructions.

As described in more detail below, one or more of the UEs 111-119 include circuitry, programming, or a combination thereof for scheduling for receptions over multiple antenna panels. In certain embodiments, and one or more of the BSs 101-103 includes circuitry, programming, or a combination thereof for scheduling a UE capable of receptions over multiple antenna panels.

Although FIG. 1 illustrates one example of a wireless network, various changes may be made to FIG. 1. For example, the wireless network could include any number of BSs and any number of UEs in any suitable arrangement. Also, the BS 101 could communicate directly with any number of UEs and provide those UEs with wireless broadband access to the network 130. Similarly, each BS 102-103 could communicate directly with the network 130 and provide UEs with direct wireless broadband access to the network 130. Further, the BSs 101, 102, and/or 103 could provide access to other or additional external networks, such as external telephone networks or other types of data networks.

FIG. 2 illustrates an example BS 102 according to embodiments of the present disclosure. The embodiment of the BS 102 illustrated in FIG. 2 is for illustration only, and the BSs 101 and 103 of FIG. 1 could have the same or similar configuration. However, BSs come in a wide variety of configurations, and FIG. 2 does not limit the scope of this disclosure to any particular implementation of a BS. It is noted that BS 101 of FIG. 1 and BS 103 of FIG. 1 can include the same or similar structure illustrated in FIG. 2.

As shown in FIG. 2, the BS 102 includes multiple antennas 205a-205n, multiple radio frequency (RF) transceivers 210a-210n, transmit (TX) processing circuitry 215, and receive (RX) processing circuitry 220. The BS 102 also includes a controller/processor 225, a memory 230, and a backhaul or network interface 235.

The RF transceivers 210a-210n receive, from the antennas 205a-205n, incoming RF signals, such as signals transmitted by UEs in the wireless network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the BS 102. For example, the controller/processor 225 could control the reception of uplink (UL) channel signals and the transmission of downlink (DL) channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support scheduling for a UE capable of receptions over multiple antenna panels. Any of a wide variety of other functions could be supported in the BS 102 by the controller/processor 225. In some embodiments, the controller/processor 225 includes at least one microprocessor or microcontroller.

The controller/processor 225 is also capable of executing programs and other processes resident in the memory 230, such as an OS. The controller/processor 225 can move data into or out of the memory 230 as required by an executing process. In certain embodiments, the controller/processor 225 supports scheduling a UE capable of receptions over multiple antenna panels. For example, the controller/processor 225 can move data into or out of the memory 230 according to a process that is being executed.

The controller/processor 225 is also coupled to the backhaul or network interface 235. The backhaul or network interface 235 allows the BS 102 to communicate with other devices or systems over a backhaul connection or over a network. The network interface 235 could support communications over any suitable wired or wireless connection(s). For example, when the BS 102 is implemented as part of a cellular communication system (such as one supporting 5G/NR, LTE, or LTE-A), the network interface 235 could allow the BS 102 to communicate with other BSs over a wired or wireless backhaul connection. When the BS 102 is implemented as an access point, the network interface 235 could allow the BS 102 to communicate over a wired or wireless local area network or over a wired or wireless connection to a larger network (such as the Internet). The network interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of BS 102, various changes may be made to FIG. 2. For example, the BS 102 could include any number of each component shown in FIG. 2. As a particular example, an access point could include a number of network interfaces 235, and the controller/processor 225 could support routing functions to route data between different network addresses. As another particular example, while shown as including a single instance of TX processing circuitry 215 and a single instance of RX processing circuitry 220, the BS 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 and 117-119 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a RF transceiver 310, TX processing circuitry 315, a microphone 320, and receive (RX) processing circuitry 325. The UE 116 also includes a speaker 330, a processor 340, an input/output (I/O) interface (IF) 345, an input device 350, a display 355, and a memory 360. The memory 360 includes an operating system (OS) 361 and one or more applications 362.

The RF transceiver 310 receives, from the antenna 305, an incoming RF signal transmitted by a BS of the wireless network 100. The RF transceiver 310 down-converts the incoming RF signal to generate an intermediate frequency (IF) or baseband signal. The IF or baseband signal is sent to the RX processing circuitry 325 that generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from BSs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input device 350. The operator of the UE 116 can use the input device 350 to enter data into the UE 116. The input device 350 can be a keyboard, touchscreen, mouse, track ball, voice input, or other device capable of acting as a user interface to allow a user in interact with the UE 116. For example, the input device 350 can include voice recognition processing, thereby allowing a user to input a voice command. In another example, the input device 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme.

The processor 340 is also coupled to the display 355. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4:
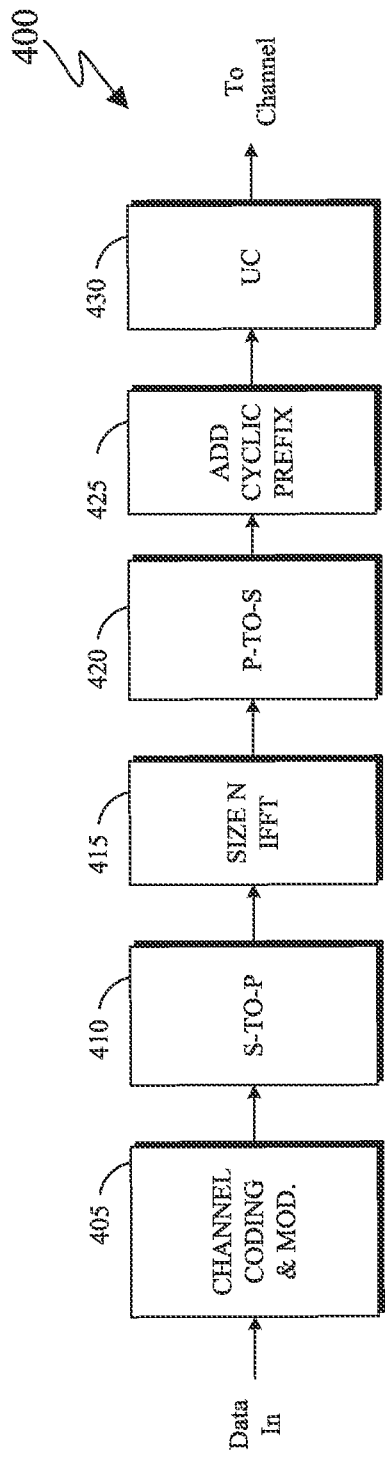
FIGS. 4 and 5 illustrate example wireless transmit and receive paths according to embodiments of present disclosure.
Figure 5:
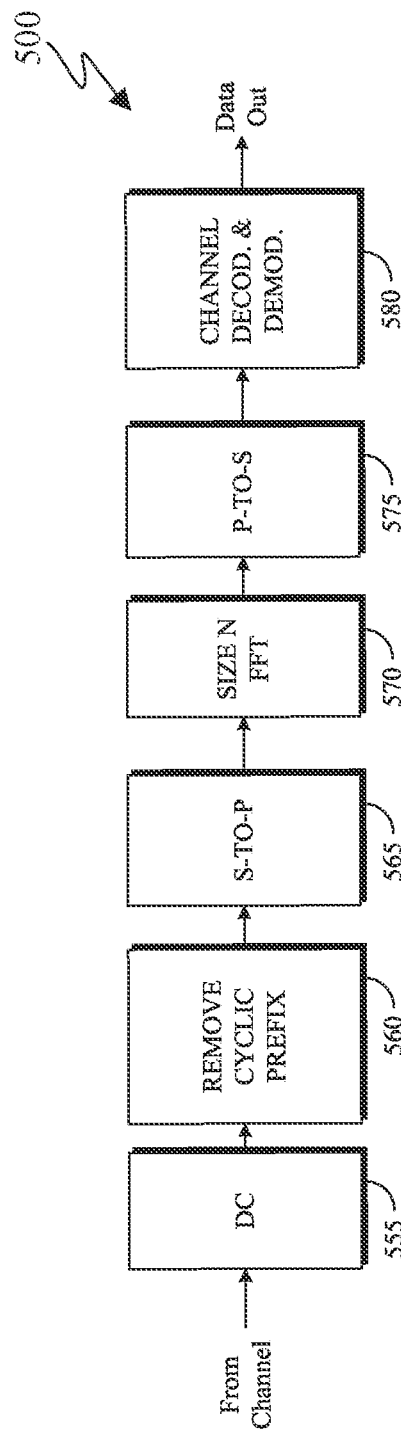

FIG. 4 and FIG. 5 illustrate example wireless transmit and receive paths according to this disclosure. In the following description, a transmit path 400, of FIG. 4, may be described as being implemented in a BS (such as the BS 102), while a receive path 500, of FIG. 5, may be described as being implemented in a UE (such as a UE 116). However, it may be understood that the receive path 500 can be implemented in a BS and that the transmit path 400 can be implemented in a UE. In some embodiments, the receive path 500 is configured to support scheduling for a UE capable of receptions over multiple antenna panels as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the BS 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the BS 102 arrives at the UE 116 after passing through the wireless channel, and reverse operations to those at the BS 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the BSs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-118. Similarly, each of UEs 111-118 may implement the transmit path 400 for transmitting in the uplink to the BSs 101-103 and may implement the receive path 500 for receiving in the downlink from the BSs 101-103.

Furthermore, each of UEs 111-119 may implement a transmit path 400 for transmitting in the sidelink to another one of UEs 111-119 and may implement a receive path 500 for receiving in the sidelink from another one of UEs 111-119.

Each of the components in FIG. 4 and FIG. 5 can be implemented using hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

A unit for DL signaling or for UL signaling on a cell is referred to as a slot and can include one or more symbols. A bandwidth (BW) unit is referred to as a resource block (RB). One RB includes a number of sub-carriers (SCs). For example, a slot can have duration of one millisecond and an RB can have a bandwidth of 180 kHz and include 12 SCs with inter-SC spacing of 15 kHz. A sub-carrier spacing (SCS) can be determined by a SCS configuration μ as $2^{\mu} \cdot 15$ kHz. A unit of one sub-carrier over one symbol is referred to as a resource element (RE). A unit of one RB over one symbol is referred to as a physical RB (PRB).

DL signals include data signals conveying information content, control signals conveying DL control information (DCI), reference signals (RS), and the like that are also known as pilot signals. A BS (such as the BS 102) transmits data information or DCI through respective PDSCHs or PDCCHs. A PDSCH or a PDCCH can be transmitted over a variable number of slot symbols including one slot symbol.

A PDCCH transmission that is over a number of control channel elements (CCEs) from a predetermined set of numbers of CCEs referred to as CCE aggregation level. A PDCCH transmission that is within time-frequency resources of a CORESET and over a number of CCEs from a predetermined set of numbers of CCEs referred to as CCE aggregation level.

A PDSCH transmission is scheduled by a DCI format or is semi-persistently scheduled (SPS) as configured by higher layers and activated by a DCI format. A PDSCH reception by a UE provides one or more transport blocks (TBs), wherein a TB is associated with a hybrid automatic repeat request (HARQ) process that is indicated by a HARQ process number field in a DCI format scheduling the PDSCH reception or activating a SPS PDSCH reception.

A TB transmission can be an initial one or a retransmission as identified by a new data indicator (NDI) field in the DCI format scheduling a PDSCH reception that provides a TV retransmission or a given HARQ process number.

A BS transmits one or more of multiple types of RS including channel state information (CSI) RS and demodulation RS (DM-RS). A CSI-RS is intended for UEs (such as the UE 116) to perform measurements and provide channel state information (CSI) to a BS. For channel measurement or for time tracking, non-zero power (NZP) CSI-RS resources can be used. For interference measurement reports (IMRs), CSI interference measurement (CSI-IM) resources can be used. The CSI-IM resources can also be associated with a zero power CSI-RS (ZP CSI-RS) configuration. A UE can determine CSI-RS reception parameters through DL control signaling or higher layer signaling, such as RRC signaling from a BS. A DM-RS is typically transmitted within a BW of a respective PDCCH or PDSCH and a UE can use the DM-RS to demodulate data or control information.

UL signals also include data signals conveying information content, control signals conveying UL control information (UCI), DM-RS associated with data or UCI demodulation, sounding reference signals (SRS) enabling a BS to perform UL channel measurement, and a random access (RA) preamble enabling a UE (such as the UE 116) to perform random access. A UE transmits data information or UCI through a respective physical UL shared channel (PUSCH) or a physical UL control channel (PUCCH). A PUSCH or a PUCCH can be transmitted over a variable number of slot symbols including one slot symbol. When a UE simultaneously transmits data information and UCI, the UE can multiplex both in a PUSCH or, depending on a UE capability, transmit both a PUSCH with data information and a PUCCH with UCI at least when the transmissions are on different cells.

UCI includes HARQ-ACK information, indicating correct or incorrect decoding of TB s or of code block groups (CBGs) in a PDSCH, scheduling request (SR) indicating whether a UE has data in its buffer to transmit, and CSI reports enabling a BS to select appropriate parameters for PDSCH/TB or PDCCH/DCI format transmissions to a UE. A UE transmits a PUCCH on a primary cell of a cell group. HARQ-ACK information is either a positive acknowledgement (ACK) when a TB decoding is correct or a negative acknowledgement (NACK) when a TB decoding is incorrect. An ACK can be represented by a binary '1' value and a NACK can be represented by a binary '0' value.

A UE can also multiplex HARQ-ACK information in a slot indicated by a value of PDSCH-to-HARQ_feedback timing indicator field in the DCI format, from a set of slot timing values $K_1$, or indicated by higher layers in case of a SPS PDSCH reception.

In certain embodiments, UL RS includes dedicated demodulation reference signals (DMRS) and SRS. DMRS is typically transmitted within a BW of a respective PUSCH or PUCCH. A BS (such as the BS 102) can use a DMRS to demodulate information in a respective PUSCH or PUCCH. SRS is transmitted by a UE to provide a BS with an UL CSI and, for a TDD system, to also provide a precoding matrix indicator (PMI) for DL transmission. Further, as part of a random access procedure or for other purposes, a UE can transmit a physical random access channel (PRACH).

DL receptions and UL transmissions by a UE can be configured to occur in a corresponding DL BWP and UL BWP. A DL/UL BWP is smaller than or equal to a DL/UL bandwidth of a serving cell. DL transmission from a BS and UL transmission from a UE can be based on OFDM waveform including variant using DFT precoding that is known as DFT-spread-OFDM.

Figure 6:
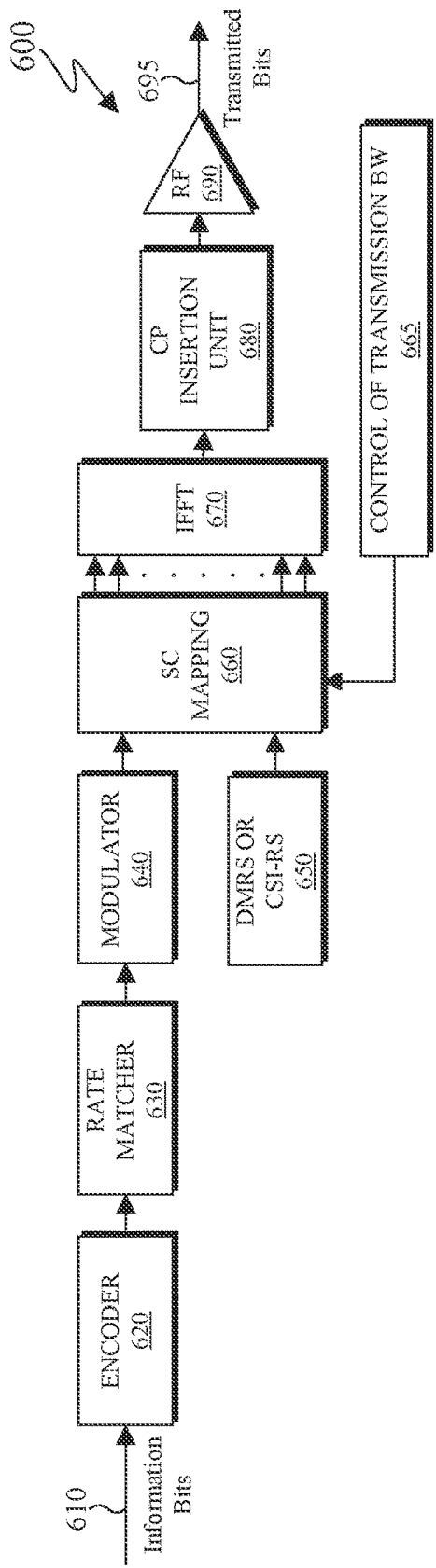
FIG. 6 illustrates a block diagram of an example transmitter structure using orthogonal frequency division multiplexing (OFDM) according to embodiments of the present disclosure.
Figure 7:
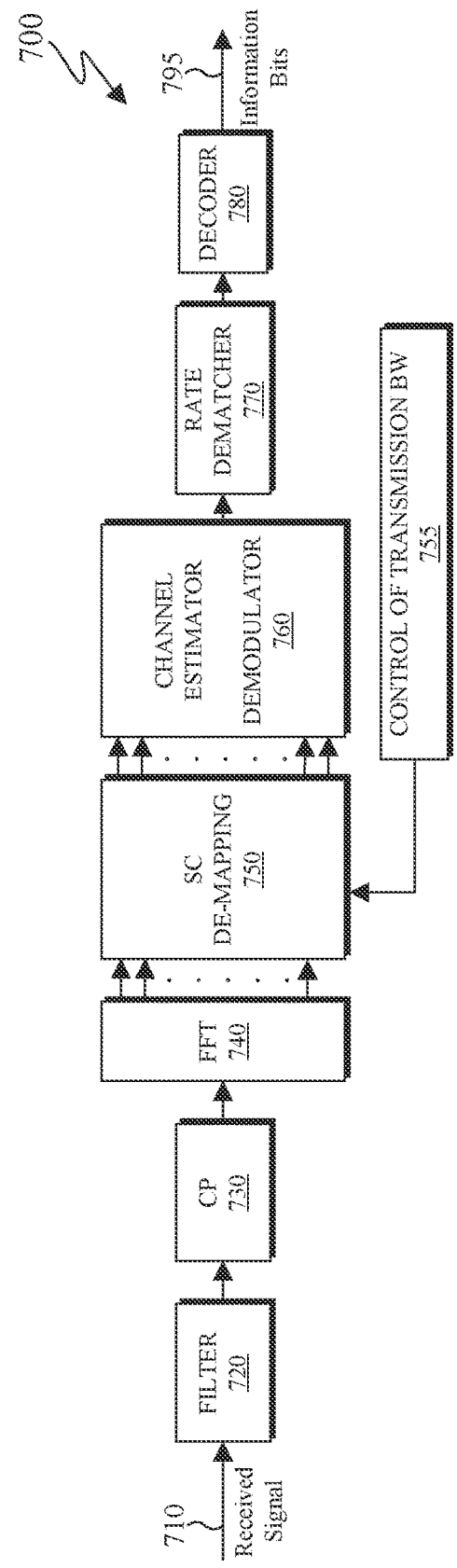
FIG. 7 illustrates a block diagram of an example receiver structure using OFDM according to embodiments of the present disclosure.

FIG. 6 illustrates a block diagram 600 of an example transmitter structure using OFDM according to embodiments of the present disclosure. FIG. 7 illustrates a block diagram 700 of an example receiver structure using OFDM according to embodiments of the present disclosure. The transmitter structure as shown in the block diagram 600 and the receiver structure as shown in the block diagram 700 can be similar to the RF transceivers 210a-210n of FIG. 2 and the RF transceiver 310 of FIG. 3. The example block diagram 600 of FIG. 6 and the block diagram 700 of FIG. 7 are for illustration only and other embodiments can be used without departing from the scope of the present disclosure.

As illustrated in the block diagram 600, information bits 610, such as DCI bits or data bits, are encoded by encoder 620, rate matched to assigned time/frequency resources by rate matcher 630, and modulated by modulator 640. Subsequently, modulated encoded symbols and DMRS or CSI-RS 650 are mapped to SCs by SC mapping unit 660 with input from BW selector unit 665, an IFFT is performed by filter 670, a cyclic prefix (CP) is added by CP insertion unit 680, and a resulting signal is filtered by filter 690 and transmitted by a radio frequency (RF) unit as transmitted bits 695.

As illustrated in the block diagram 700, a received signal 710 is filtered by filter 720, a CP removal unit 730 removes a CP, a filter 740 applies a fast FFT, SCs de-mapping unit 750 de-maps SCs selected by BW selector unit 755, received symbols are demodulated by a channel estimator and a demodulator unit 760, a rate de-matcher 770 restores a rate matching, and a decoder 780 decodes the resulting bits to provide information bits 790.

A UE (such as the UE 116) can monitor multiple candidate locations for respective potential PDCCH receptions to decode multiple DCI formats in a slot according to search space sets. A DCI format includes cyclic redundancy check (CRC) bits in order for the UE to confirm a correct detection of the DCI format. A DCI format type is identified by a radio network temporary identifier (RNTI) that scrambles the CRC bits. The UE can be configured number of search space sets, wherein a search space set is defined by associated DCI formats, number of PDCCH candidates per CCE aggregation level, a periodicity in number of slots, a duration in number of consecutive slots, and so on. When a UE monitors PDCCH according to a common search space (CSS), a corresponding search space set is referred to as CSS set. When a UE monitors PDCCH according to a UE-specific search space (USS), a corresponding search space set is referred to as USS set.

For a DCI format scheduling a PDSCH or a PUSCH to a single UE, the RNTI can be a cell RNTI (C-RNTI), or a configured scheduling RNTI (CS-RNTI), or a modulation and coding scheme cell RNTI (MCS-C-RNTI) and serves as a UE identifier. In the following, for brevity, only the C-RNTI will be referred to when needed. A UE typically receives/monitors PDCCH for detections of DCI formats with CRC scrambled by a C-RNTI according to USS. For DCI format 0_0 and DCI format 1_0 that schedule PUSCH transmissions and PDSCH receptions, respectively, to a UE, the UE can additionally be configured to monitor corresponding PDCCH according to CSS.

For a DCI format scheduling a PDSCH conveying system information (SI), the RNTI can be an SI-RNTI. For a DCI format scheduling a PDSCH providing a random access response (RAR), the RNTI can be an RA-RNTI. For a DCI format scheduling a PDSCH providing paging information, the RNTI can be a P-RNTI. A UE (such as the UE 116) monitors PDCCH for these DCI formats according to a corresponding CSS on a primary cell. There are also a number of other RNTIs provided to a UE by UE-specific RRC signaling and are associated with DCI formats providing various control information and have corresponding PDCCHs that a UE monitors according to CSS. Such DCI formats include a DCI format 2_0 providing a structure of a slot in term of DL, UL or flexible/reserved symbols over a number of slots, a DCI format 2_2 providing transmit power control (TPC) commands for PUSCH or PUCCH transmissions, a DCI format 2_3 providing TPC commands for SRS transmissions and also potentially triggering a SRS transmission on a number of cells, and so on.

A CSI report from a UE can be periodic and multiplexed in a PUCCH transmission, semi-persistent and multiplexed in a periodic PUCCH or PUSCH transmission that is configured by higher layers, or aperiodic and multiplexed in a PUSCH or PUCCH transmission that is scheduled by a DCI format in a PDCCH. A CSI report can include a channel quality indicator (CQI), a precoding matrix indicator (PMI), a CSI-RS resource indicator (CRI), a synchronized signal (SS) physical broadcast channel (PBCH) block resource indicator (SSBRI), a layer indicator (LI), a rank indicator (RI), a layer 1 reference signal received power (L1-RSRP) or a layer 1 signal-to-interference and noise ratio (L1-SINR).

A CSI payload can depend on a report RI value because the RI value determines a bit-width for a precoding matrix indicator (PMI) and a number of codewords (CWs). For example, a PDSCH transmission with one CW can apply for RI≤4 and PDSCH transmission with two CWs can apply for RI>4. A number of CQIs is determined from a number of CWs. For example, for one report per CQI reporting band ("wideband" or "sub-band"), there is one CQI per CW. Also, when the UE is configured with multiple non-zero-power (NZP) CSI-RS resources and to report CRI, a RI/PMI/CQI payload can depend on a value of CRI when a variable number of antenna ports is associated with different CSI-RS resources. Therefore, a CSI report with two parts (Part 1 CSI and Part 2 CSI) needs to be used as a payload of Part 1 CSI report can be predetermined and a payload of Part 2 CSI report can be variable. Part 1 CSI includes RI, CRI, CQI for the first CW and, for Type II CSI, additional information such as the number of non-zero amplitude coefficients for the two layers and has a predetermined payload. Part 2 CSI includes RI, CRI, CQI for the second CW and, in general, has a variable payload that is determined from information provided in Part 1 CSI. There are also conditions where the payload of the second part does not depend on the content of the first part. In such scenarios, using a two-part CSI report can be simplified to a single part CSI report.

A sub-band for CSI reporting is defined as a set of contiguous PRBs. The number of PRBs in a sub-band can be predetermined in a system operation as a function of a DL system bandwidth such as an active DL bandwidth part (BWP), or provided by higher layers, or by a DCI format in a PDCCH. A number of PRBs in a sub-band can be included in a configuration for a CSI report. A "CSI reporting band" is defined as a set of either contiguous or non-contiguous sub-bands for a CSI report. For example, a CSI report band can include all sub-bands within an active DL BWP (wideband CSI report). Alternatively, a CSI report band can include only a set of sub-bands within an active DL BWP and is also referred to as partial band CSI report.

A UE (such as the UE 116) can be configured for a CSI report for at least one CSI reporting band. The configuration can be by higher layers or by a DCI format in a PDCCH. When configured to report CSI over multiple CSI reporting bands, such as when operating at mmWave carrier frequencies, a UE can report CSI for any subset of the multiple CSI reporting bands. The number of CSI reporting bands in the subset can either be provided by higher layers or indicated by a DCI format in a PDCCH that triggers a CSI report. The UE may also recommend a value for the number of CSI reporting bands.

For a CSI report generation, a UE (such as the UE 116) can be provided multiple configurations for a CSI-Report- Config information element (IE). A configuration for a CSI-ReportConfig IE can include (a) a Table for mapping CQI value to an MCS value or an SE value, (b) whether the CSI report includes a single (wideband) or multiple (sub-band) CQIs, (c) signals to measure and CQI quantities to report, (d) a periodicity and offset for the PUCCH transmission when the CSI report in multiplexed in a PUCCH, (e) a PUCCH resource for the PUCCH transmission, and so on.

An A-CSI report can be triggered by a DCI format and the UE multiplexes the A-CSI report in an associated PUSCH transmission. that can be with or without data information from an UL shared channel (UL-SCH), or in an associated PUCCH transmission. One value/state of the field indicates no A-CSI report to be multiplexed in the PUSCH transmission. Other values of the field are configured by higher layers to map to one or more of configuration of a CSI-ReportConfig IE for example as described in REF 5, that determine the contents of the A-CSI report. The UE can be provided an aperiodic SRS resource set and the UE can be indicated an NZP-CSI-RS configuration to determine a CSI report by a value of an SRS request field in a DCI format scheduling a PUSCH transmission with the A-CSI report, wherein the SRS request field value indicates an SRS resource set that includes an identity of the NZP-CSI-RS configuration.

It is also beneficial to trigger A-CSI reports by a DCI format scheduling a PDSCH reception as a CSI report is typically associated with PDSCH receptions and a UE may not be configured to monitor PDCCH for detection of a DCI format scheduling a PUSCH transmission. For example, a UE configured to receive PDSCH only for multicast-broadcast services (MBS) may be configured search space sets only for PDCCH receptions that provide DCI formats scheduling MBS PDSCH receptions. Including an A-CSI report trigger and an indication of an NZP-CSI-RS configuration for a corresponding CSI report in a DCI format scheduling a PDSCH reception can provide the intended functionality for multiplexing of an A-CSI report in a PUCCH transmission. The PUCCH transmission can be same or different than a PUCCH transmission where the UE reports HARQ-ACK information in response to a decoding outcome of a TB in the PDSCH.

A UE can be configured for communication with different service types that require separate CSI reports. For example, as MBS PDSCH receptions are from multiple UEs, a corresponding transmission configuration indicator (TCI) state can correspond to a wide beam while a TCI state for a unicast PDSCH reception can correspond to a narrow beam. Therefore, it is beneficial to enable a UE to provide separate CSI reports for different service types having respective PDSCH receptions associated with different TCI states, such as for MBS PDSCH and for unicast PDSCH.

As a UE can be configured to receive PDSCHs according to different TCI states on an active DL BWP of a serving cell, it is beneficial that the UE can be enabled to provide a CSI report for each TCI state. To minimize latency and signaling overhead, means should be established to enable a UE to provide, in a same PUCCH or PUSCH transmission, multiple CSI reports corresponding to multiple TCI states associated with corresponding multiple SS/PBCH blocks or CSI-RS that the UE receives in an active DL BWP of a serving cell.

A UE (such as the UE 116) can also be configured to receive PDCCH in a control resource set (CORESET) with a spatial filter associated with a TCI state corresponding to the CORESET. When the UE monitors PDCCH candidates in time overlapping PDCCH occasions in multiple CORESETs that are associated with different spatial reception parameters, also referred to as quasi-collocation (QCL) 'typeD' properties, the UE monitors PDCCHs only in CORESETs that have same typeD properties as the CORESET corresponding to a CSS set with the lowest index in the cell with the lowest index where the UE is configured to monitor PDCCH according to CSS, if any; otherwise, the UE monitors PDCCHs only in CORESETs that have same typeD properties as the CORESET corresponding to a USS set with the lowest index in the cell with the lowest index where the UE is configured to monitor PDCCH according to CSS. The indexes of CSS sets or USS sets are for corresponding sets with at least one PDCCH candidate in overlapping PDCCH monitoring occasions. For the purpose of determining the CORESET, a SS/PBCH block is considered to have different 'typeD' properties than a CSI-RS, and a first CSI-RS in a first cell and a second CSI-RS in a second cell that are associated with a same SS/PBCH block are assumed to have same 'typeD' properties. The allocation of non-overlapping CCEs and of PDCCH candidates for PDCCH monitoring is according to all search space sets associated with the multiple CORESETs on the active DL BWP(s) of the one or more cells and the number of active TCI states is determined from the multiple CORESETs.

A UE (such as the UE 116) can have multiple antenna panels and be capable of simultaneous receptions with different spatial filters that are associated with different TCI states. For example, the UE can receive a unicast PDSCH with a first spatial filter associate with a first TCI state using a first antenna panel and receive an MBS PDSCH with a second spatial filter associated with a second TCI state using a second antenna panel. For example, the UE can receive a PDSCH from a first transmission/reception point (TRP) with a first spatial filter associated with a first TCI state using a first antenna panel and receive a PDSCH from a second transmission/reception point (TRP) with a second spatial filter associated with a second TCI state using a second antenna panel. A UE can also apply a capability to simultaneously receive with multiple spatial filters for PDCCH receptions in CORESETs associated with different TCI states.

When a UE is triggered to transmit a CSI report in a PUSCH that the UE transmits with repetitions, the UE multiplexes the CSI report in a first repetition of the PUSCH transmission. A preparation time, $T_{proc,CSI}^{mux}$, for a UE to a transmit PUSCH with a multiplexed CSI report is longer than a preparation time, $T_{proc,2}$, for a UE to transmit a PUSCH without a CSI report and the difference can be significant. For example, for 15 kHz SCS, $T_{proc,2}$=0.79 msec and $T_{proc,CSI}^{mux}$=3 msec. Therefore, requiring a CSI report to be multiplexed in a first repetition of a PUSCH transmission consequently requires that a PUSCH transmission is delayed and such a requirement on a PUSCH scheduling delay further penalizes latency and spectral efficiency of a PUSCH transmission with repetitions. Moreover, when a UE supports measurements of multiple NZP-CSI-RS in order to multiplex corresponding CSI reports in a same PUSCH or PUCCH transmission, a larger $T_{proc,CSI}^{mux}$ value can be required than the one for a measurement corresponding to a single NZP-CSI-RS.

Therefore, embodiments of the present disclosure take into consideration that there is a need to provide means for a UE to measure reference signals associated with different TCI states and to trigger corresponding CSI reports in a PUSCH or a PUCCH transmission. Embodiments of the present disclosure also take into consideration that there is a need to determine a processing time for a UE to multiplex multiple CSI reports, obtained from reference signals with different TCI states on an active DL BWP of a same serving cell, in a PUSCH or PUCCH transmission. Embodiments of the present disclosure further take into consideration that there is a need to determine a repetition of a PUSCH or PUCCH transmission for a UE to multiplex a CSI report while minimizing a corresponding scheduling latency for the PUSCH or PUCCH transmission. Additionally, embodiments of the present disclosure take into consideration that there is a need to determine a procedure for a UE to simultaneously receive PDCCHs in multiple CORESETs associated with different TCI states.

Accordingly, embodiments of the present disclosure relate to providing means for a UE to measure reference signals associated with different TCI states and to trigger corresponding CSI reports in a PUSCH or a PUCCH transmission. Embodiments of the present disclosure also relates to determining a processing time for a UE to multiplex multiple CSI reports, obtained from reference signals with different TCI states on an active DL BWP of a same serving cell, in a PUSCH or PUCCH transmission. Embodiments of the present disclosure further relates to determining a repetition of a PUSCH or PUCCH transmission for a UE to multiplex a CSI report while minimizing a corresponding scheduling latency for the PUSCH or PUCCH transmission. Additionally, embodiments of the present disclosure relate to determining a procedure for a UE to simultaneously receive PDCCHs in multiple CORESETs associated with different TCI states.

As used herein below, the term "higher layers" is used to denote control information that a UE is provided in a PDSCH reception, such as RRC or MAC control element (CE).

Embodiments of the present disclosure describe triggering measurements of multiple reference signals and corresponding CSI reports. This is described in following examples and embodiments such as those of FIGS. 8 and 9.

Figure 8:
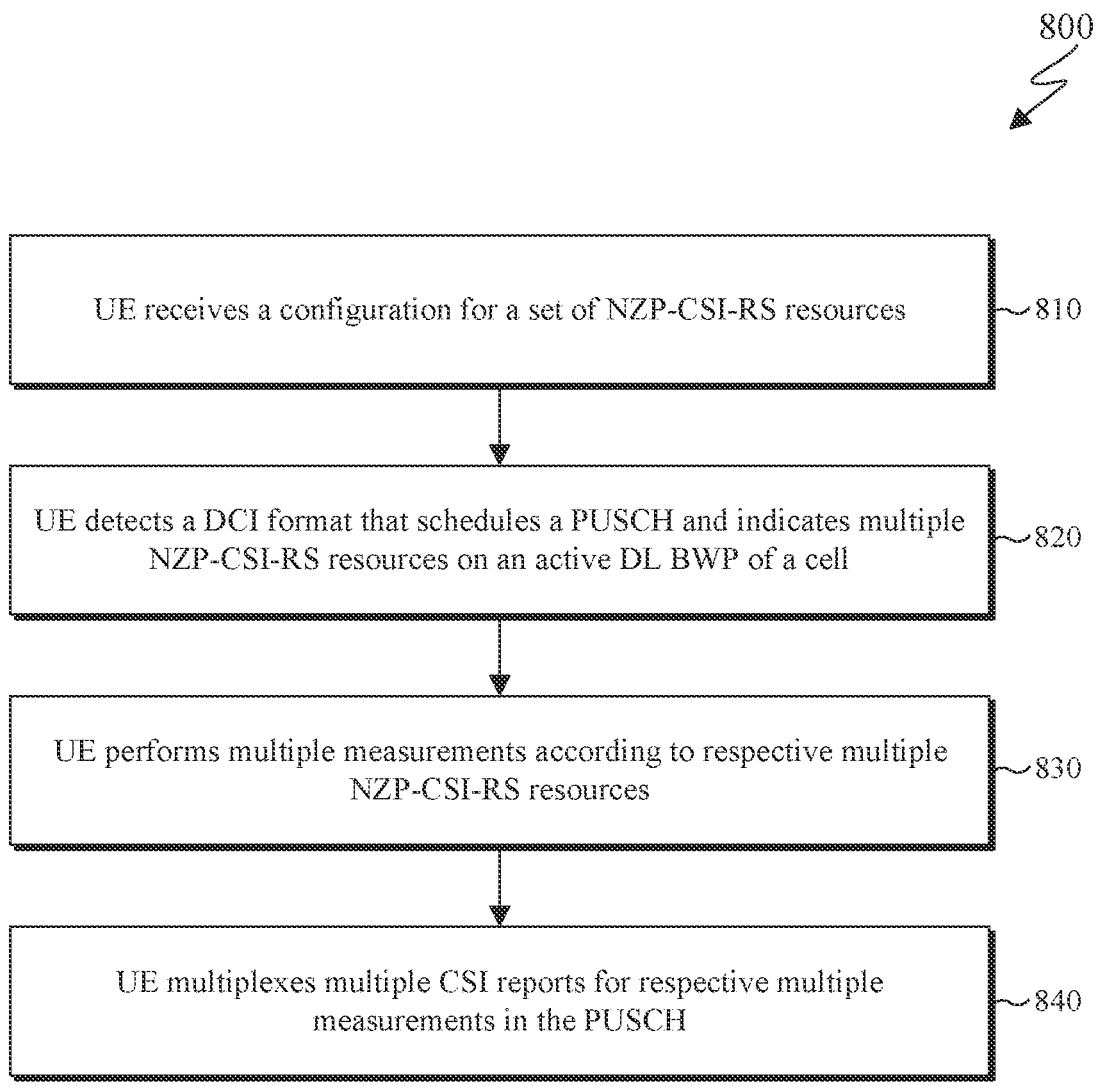
FIG. 8 illustrates an example method for indicating multiple non-zero power (NZP) channel state information (CSI) reference signals (RS) configurations for a UE to perform measurements and provide corresponding multiple CSI reports according to embodiments of the present disclosure.
Figure 9:
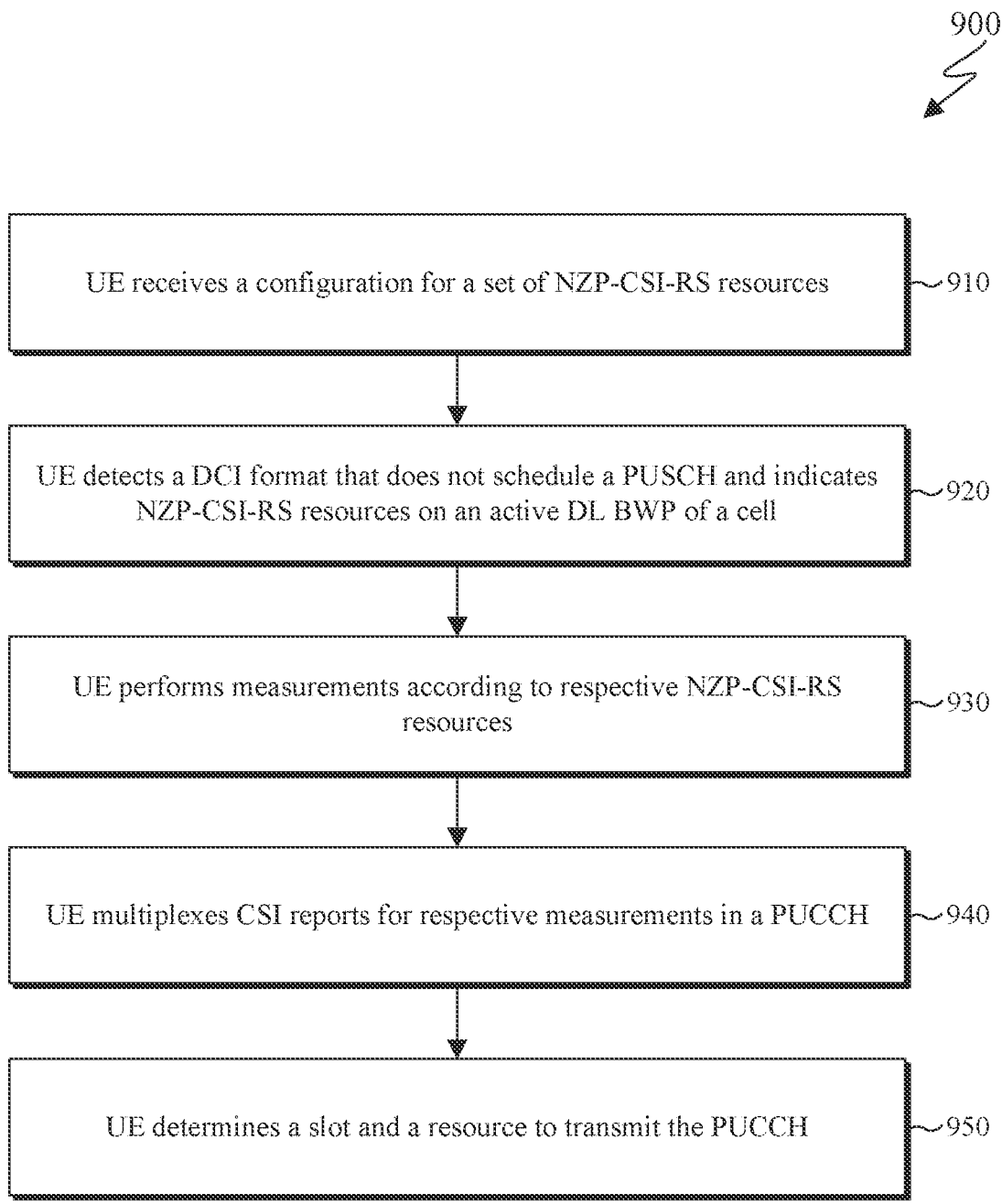
FIG. 9 illustrates an example method to indicate configurations of multiple NZP-CSI-RS resources to a UE by a downlink control information (DCI) format that does not schedule a physical uplink shared channel (PUSCH) transmission for the UE to perform measurements and provide corresponding multiple CSI reports according to embodiments of the present disclosure.

FIG. 8 illustrates an example method 800 for indicating multiple NZP-CSI-RS configurations for a UE to perform measurements and provide corresponding multiple CSI reports according to embodiments of the present disclosure. FIG. 9 illustrates an example method 900 to indicate configurations of multiple NZP-CSI-RS resources to a UE by a DCI format that does not schedule a PUSCH transmission for the UE to perform measurements and provide corresponding multiple CSI reports according to embodiments of the present disclosure. The steps of the method 800 and the method 900 can be performed by any of the UEs 111-119 of FIG. 1, such as the UE 116 of FIG. 3. The methods 800 and 900 are for illustration only and other embodiments can be used without departing from the scope of the present disclosure.

Embodiments of this disclosure consider mechanisms for triggering measurements of multiple reference signals on an active DL BWP of a serving cell and for multiplexing corresponding CSI reports in a PUSCH or PUCCH transmission. For example, a reference signal can be an SS/PBCH block or an NZP-CSI-RS. For brevity of the descriptions and examples associated with triggering measurements of multiple reference signals and corresponding CSI reports, reference NZP-CSI-RS. However, measurements can also be based on CSI-IM resources, but separate duplicated descriptions are omitted for brevity.

In a first approach, a DCI format scheduling a PUSCH transmission can include at least one of (i) an SRS resource indicator (SRI) field with a value indicating an aperiodic SRS resource set that includes/maps to multiple NZP-CSI-RS resources; (ii) a CSI request field with a value that indicates multiple NZP-CSI-RS resources and respective multiple CSI report configurations wherein a corresponding mapping can be provided in advance by higher layers; or (iii) a separate field (other than an SRI field or a CSI request filed) that indicates multiple NZP-CSI-RS resources from multiple sets of NZP-CSI-RS resources (in addition to a CSI request field).

In certain embodiments, the multiple NZP-CSI-RS resources are on an active DL BWP of a serving cell. The indication can be based on an identity of an NZP-CSI-RS resource. Different NZP-CSI-RS resources can include different TCI states. When the field is for a CSI request, a value can map both to a CSI report configuration and an NZP-CSI-RS resource configuration. Upon detection of the DCI format and based on a value of a field indicating multiple NZP-CSI-RS configurations, the UE performs measurements according to the multiple NZP-CSI-RS configurations and determines corresponding multiple CSI reports according to corresponding configurations as indicated by the CSI request field. It is also possible that instead of providing a mapping to multiple CSI report configurations, a value of the CSI request field provides a CSI report configuration that is same for all multiple CSI reports.

The method 800 as illustrated in FIG. 8, describes an example procedure for indicating, by a DCI format that schedules a PUSCH transmission, multiple NZP-CSI-RS configurations for a UE to perform measurements and provide corresponding multiple CSI reports.

In step 810, a UE (such as the UE 116) receives a configuration for a set of NZP-CSI-RS resources, wherein each NZP-CSI-RS resource includes an identity and configuration of corresponding parameters, such as a resource mapping, a power offset, or a transmission periodicity. In step 820, the UE detects a DCI format that schedules a PUSCH transmission and includes a field with a value indicating multiple NZP-CSI-RS resources on an active DL BWP of a serving cell. The field can be an SRI field, a CSI request field, or a separate field indicating NZP-CSI-RS resources. In step 830, the UE performs multiple measurements according to the indicated multiple NZP-CSI-RS resources. In step 840, the UE multiplexes multiple CSI reports for the respective multiple measurements in the PUSCH transmission.

In certain embodiments, when a UE multiplexes multiple CSI reports based on respective multiple measurements for NZP-CSI-RS resources, the UE can require additional processing time for the measurements. The additional processing time can be based on a UE capability. For example, for two measurements of corresponding two NZP-CSI-RS resources for determining two respective CSI reports on an active DL BWP of a serving cell, a UE can inform a serving gNB of a first capability where additional processing time is not needed to perform the two measurements and $T_{proc,CSI}^{mux}$ applies, or of a second capability where additional processing time is needed to perform the two measurements and a new $T_{proc,CSI}^{mux,2} > T_{proc,CSI}^{mux}$ applies, wherein $T_{proc,CSI}^{mux,2}$ can be defined in the specifications of the system operation or can be informed by the UE as part of capability signaling.

The NZP-CSI-RS resources can be overlapping or non-overlapping in time. For a UE that is not capable for simultaneous receptions with different spatial filters, such as a UE that can receive using only one antenna panel at a given time, the NZP-CSI-RS resources can be non-overlapping in time and can be additionally separated by a time required for the UE to change spatial filters for receptions. The time between the start or end of the first NZP-CSI-RS resource and the start or end of the last NZP-CSI-RS resource can be also a component of $T_{proc,CSI}^{mux,2}$ or be subtracted from $T_{proc,CSI}^{mux,2}$. A UE can then perform NZP-CSI-RS measurements sequentially in time.

For a UE that is capable for simultaneous receptions with different spatial filters, such as a UE that can receive using two antenna panels at a given time, the NZP-CSI-RS resources can be overlapping in time. A different value for $T_{proc,CSI}^{mux,2}$ can then be applicable, compared to the $T_{proc,CSI}^{mux,2}$ value for the single reception antenna panel case, and it can also be $T_{proc,CSI}^{mux,2}=T_{proc,CSI}^{mux}$ for example when the UE has separate baseband processing units for the separate reception antenna panels.

In a second approach, a DCI format scheduling a PDSCH reception by a UE can include at least one of: (i) a CSI request field with a value that indicates multiple NZP-CSI-RS resources and respective multiple CSI report configurations wherein a mapping among values of the CSI request field and NZP-CSI-RS resources and CSI report configurations can be provided in advance by higher layers, or (ii) a separate field to indicate multiple NZP-CSI-RS resources from one or more sets of NZP-CSI-RS resources in addition to a CSI request field.

In certain embodiments, it is possible that the DCI format indicates a single CSI report configuration and a single NZP-CSI-RS resource. The multiple NZP-CSI-RS resources are on an active DL BWP of a serving cell. The indication can be based on an identity of an NZP-CSI-RS resource. For example, different NZP CSI-RS resources can include different TCI states.

In addition to the functionality previously described for a DCI format scheduling a PUSCH transmission, a DCI format scheduling a PDSCH reception needs to provide a slot timing for a PUCCH (or PUSCH) transmission where the UE multiplexes the multiple CSI reports and also needs to provide a corresponding PUCCH (or PUSCH) resource. The slot for the PUCCH transmission can be a first slot that is after the end of the PDCCH providing the DCI format by a time that is larger than or equal to a processing time for multiplexing the multiple CSI reports, such as $T_{proc,CSI}^{mux}$ or $T_{proc,CSI}^{mux,2}$. Further, the DCI format can include a field that provides an additional slot offset relative to the first slot, or the slot offset can be provided to the UE in advance by higher layers. Alternatively, the field can directly indicate the slot of the PUCCH (or PUSCH) transmission. A PUCCH (or a PUSCH) resource can be provided to the UE in advance by higher layers or a field in the DCI format can indicate the PUCCH (or a PUSCH) resource from a set of resources provided to the UE in advance by higher layers. Moreover, as described in REF 3, the UE can determine a smaller number of RBs for the PUCCH (or PUSCH) transmission than the number of RBs of the PUCCH (or PUSCH) resource based on a configured code rate. The code rate for determining a number of RBs for multiplexing CSI reports can be provided separately from a code rate that the UE uses for determining a number of RBs for multiplexing HARQ-ACK information, or the same code rate can apply for both CSI reports and HARQ-ACK information. Further, if a modulation other than QPSK is also used, the modulation order of the PUCCH resource can be considered in addition to the code rate.

In a third approach, a DCI format that does not schedule either a PUSCH transmission from a UE or a PDSCH reception by a UE can include a CSI request field with a value that indicates multiple CSI report configurations and respective multiple NZP-CSI-RS resources, wherein a corresponding mapping among values of the CSI request field and pairs of NZP-CSI-RS resource and CSI report configuration can be provided in advance by higher layers. Alternatively, the DCI format can include separate fields to indicate the multiple CSI report configurations and corresponding configurations for multiple NZP-CSI-RS resources. It is also possible that the DCI format indicates a single CSI report configuration and a configuration for a single NZP-CSI-RS resource. The multiple NZP-CSI-RS resources are on an active DL BWP of a serving cell. For the slot timing value of a PUCCH (or PUSCH) transmission where the UE multiplexes the CSI reports and for the corresponding PUCCH (or PUSCH) resource, same procedures can apply as for the second approach where a DCI format scheduling a PDSCH reception is used to trigger the CSI reports. For example, a slot timing value can be provided by a single field that is commonly applicable to all UEs triggered to provide CSI reports by the DCI format or can be provided to each UE in advance by higher layers. For example, a PUCCH (or PUSCH) resource can be provided to each UE in advance by higher layers. The CRC bits of the DCI format can be scrambled by a RNTI other than a C-RNTI and the UE can receive a PDCCH providing the DCI format either according to a CSS or according to a USS.

A UE (such as the UE 116) can be provided in advance by higher layers a location in the DCI format for the CSI request field or for the CSI request field and the field indicating multiple NZP-CSI-RS resources (the two fields can be located consecutively for a UE and only a location for the first field needs to be provided by higher layers). A size of the CSI request field or a size of the field indicating the multiple NZP-CSI-RS resources can be specified in the system operation or be provided by higher layers. Alternatively, when the DCI format triggers NZP-CSI-RS receptions and corresponding CSI reports for a maximum of $N_{UE}$ UEs, the DCI format can include $N_{UE}$ fields for NZP-CSI-RS resources corresponding, in ascending order, to a maximum of $N_{UE}$ CSI request fields with values that indicate corresponding CSI reports. The CSI request fields can be consecutive and followed by the multiple NZP-CSI-RS resources configuration fields. Also, at least for a DCI format that does not schedule a PUSCH transmission, a CSI report configuration can also be provided in advance by higher layers and a field in the DCI format indicates presence or absence of NZP-CSI-RS resources for a UE to perform measurements and provide respective CSI reports according to the CSI report configuration.

The method 900 as illustrated in the FIG. 9 describes an example procedure to indicate configurations of multiple NZP-CSI-RS resources to a UE by a DCI format that does not schedule a PUSCH transmission for the UE to perform measurements and provide corresponding multiple CSI reports.

In step 910, a UE (such as the UE 116) receives a configuration for a set of NZP-CSI-RS resources, wherein each NZP-CSI-RS resource includes an identity and configuration of corresponding parameters, such as a resource mapping, a power offset, or a periodicity. In step 920, the UE detects a DCI format that does not schedule a PUSCH transmission. For example, the DCI format can be one that schedules a PDSCH reception or one that does not schedule either a PUSCH transmission or a PDSCH reception. The DCI format includes a field with a value indicating configurations for multiple CSI reports and a field indicating NZP-CSI-RS resources on an active DL BWP of a serving cell. A TCI state can be separately configured for each NZP-CSI-RS resource.

In step 930, the UE performs measurements according to the indicated NZP-CSI-RS resources. In step 940, the UE multiplexes CSI reports for the respective measurements in a PUCCH transmission. In step 950, the UE transmits the PUCCH in a slot that is a first slot that is after a reception of the PDCCH providing the DCI format by a time that is larger than or equal to a processing time for the UE to perform the measurements and multiplex the CSI reports in the PUCCH transmission, and in resource that is provided in advance by higher layers.

It is also possible that the DCI format includes a field that indicates a slot offset for the PUCCH transmission, relative to a slot for PUCCH transmissions that includes the end of the PDCCH reception or relative to the first slot, or the slot offset can be provided in advance by higher layers. It is also possible that the DCI format includes a field indicating a PUCCH resource from a set of PUCCH resources that are provided in advance by higher layers. It is also possible that the DCI format indicates a single CSI report configuration and a single NZP-CSI-RS resource.

Although FIG. 8 illustrates the method 800 and the FIG. 9 illustrates the method 900 various changes may be made to FIGS. 8 and 9. For example, while the method 800 and the method 900 are shown as a series of steps, various steps could overlap, occur in parallel, occur in a different order, or occur multiple times. In another example, steps may be omitted or replaced by other steps. For example, steps of the method 800 and the method 900 can be executed in a different order.

Embodiments of the present disclosure describe determining a repetition of a PUSCH transmission for multiplexing SCI reports. This is described in following examples and embodiments such as those of FIGS. 10A and 10B.

Figure 10A:
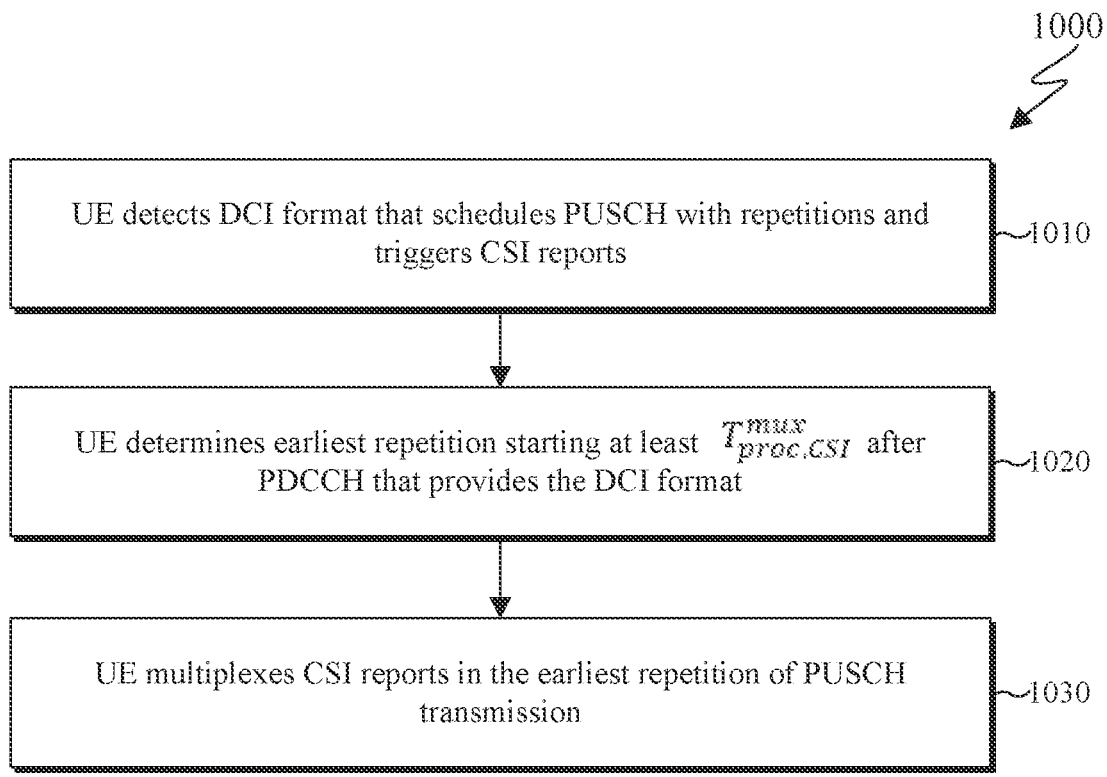
FIG. 10A illustrates an example method for a UE to determine a repetition of a PUSCH transmission for multiplexing CSI reports according to embodiments of the present disclosure.
Figure 10B:
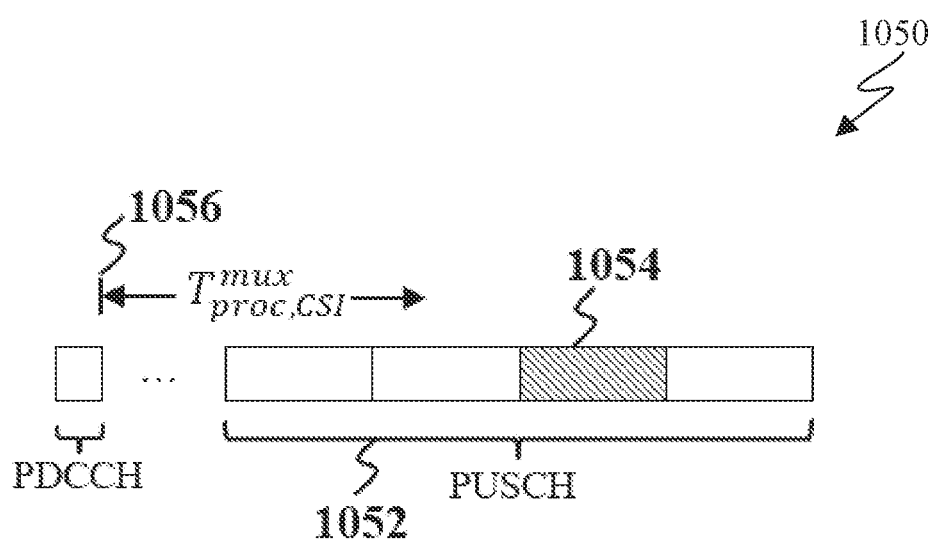
FIG. 10B illustrates a diagram of a PUSCH transmission with repetitions according to embodiments of the present disclosure.

FIG. 10A illustrates an example method 1000 for a UE to determine a repetition of a PUSCH transmission for multiplexing CSI reports according to embodiments of the present disclosure. FIG. 10B illustrates a diagram 1050 of a PUSCH transmission with repetitions according to embodiments of the present disclosure. The steps of the method 1000 can be performed by any of the UEs 111-119 of FIG. 1, such as the UE 116 of FIG. 3. The method 1000 and the diagram 1050 are for illustration only and other embodiments can be used without departing from the scope of the present disclosure.

Embodiments of this disclosure also consider a determination for a repetition of a PUSCH transmission for a UE to multiplex CSI reports that are triggered by a DCI format scheduling the PUSCH transmission.

In certain embodiments, multiplexing CSI reports in a predetermined repetition, such as a first or last repetition, of a PUSCH transmission is detrimental as it places restrictions on a gNB scheduler that can result to larger latency, smaller throughput, or more outdated CSI reports. For example, considering a UE processing time for measurements in order to determine and multiplex CSI reports in a PUSCH, multiplexing CSI reports in a first PUSCH repetition would require that the gNB scheduler delays the scheduling of the PUSCH transmission, for example from $T_{proc,2}=0.79$ msec that is a time required for a UE to prepare a PUSCH transmission for 15 kHZ SCS, to $T_{proc,CSI}^{mux}=3$ msec that is a time required for a UE to prepare a PUSCH transmission with multiplexed CSI reports. Multiplexing CSI reports in a last PUSCH repetition can result to unnecessary delays for a gNB to obtain CSI reports. In general, multiplexing CSI reports in any fixed number of a repetition for a PUSCH transmission can be suboptimal.

Considering that a required UE processing time for multiplexing CSI reports in a PUSCH is $T_{proc,CSI}^{mux}$, a repetition of a PUSCH transmission where a UE multiplexes CSI reports can be the first repetition that starts at least $T_{proc,CSI}^{mux}$ after the last symbol of the PDCCH reception that provides the DCI format scheduling the PUSCH transmission with repetitions.

The method 1000 as illustrated in FIG. 10A and the diagram 1050 as illustrated in the FIG. 10B describe a procedure for a UE to determine a repetition of a PUSCH transmission for multiplexing CSI reports.

In step 1010, a UE (such as the UE 116) detects a DCI format that schedules a PUSCH transmission with repetitions 1052 and triggers a CSI report, wherein the UE multiplexes the CSI report in one repetition of the PUSCH transmission. In step 1020, the UE determines an earliest repetition of the PUSCH transmission 1054 that starts at least $T_{proc,CSI}^{mux}$ after the end (last symbol) of a PDCCH reception 1056 that provides the DCI format. In step 1030, the UE multiplexes the CSI reports in the earliest repetition of the PUSCH transmission.

Different repetitions of a PUSCH transmission can include different UCI types, (such as HARQ-ACK information and CSI reports). In order to improve a reception reliability of a TB and of UCI types in a repetition of the PUSCH transmission, additional conditions can apply for a UE to determine a repetition for multiplexing CSI reports. One such condition can be whether or not, in addition to CSI reports, the UE multiplexes other UCI, such as HARQ-ACK information, in a repetition of a PUSCH transmission. Then, the UE can determine the repetition for multiplexing CSI reports to be the first repetition that (a) starts at least $T_{proc,CSI}^{mux}$ after the end of a PDCCH reception (or after a last symbol of a CORESET where the UE receives the PDCCH) providing the DCI format scheduling the PUSCH transmission and (b) does not include another UCI type such as HARQ-ACK information.

Although FIG. 10A illustrates the method 1000 various changes may be made to FIG. 10A. For example, while the method 1000 is shown as a series of steps, various steps could overlap, occur in parallel, occur in a different order, or occur multiple times. In another example, steps may be omitted or replaced by other steps. For example, steps of the method 1000 can be executed in a different order.

Embodiments of the present disclosure describe determining CORESETs for reception of PDCCHs. This is described in following examples and embodiments such as those of FIGS. 11 and 12.

Figure 11:
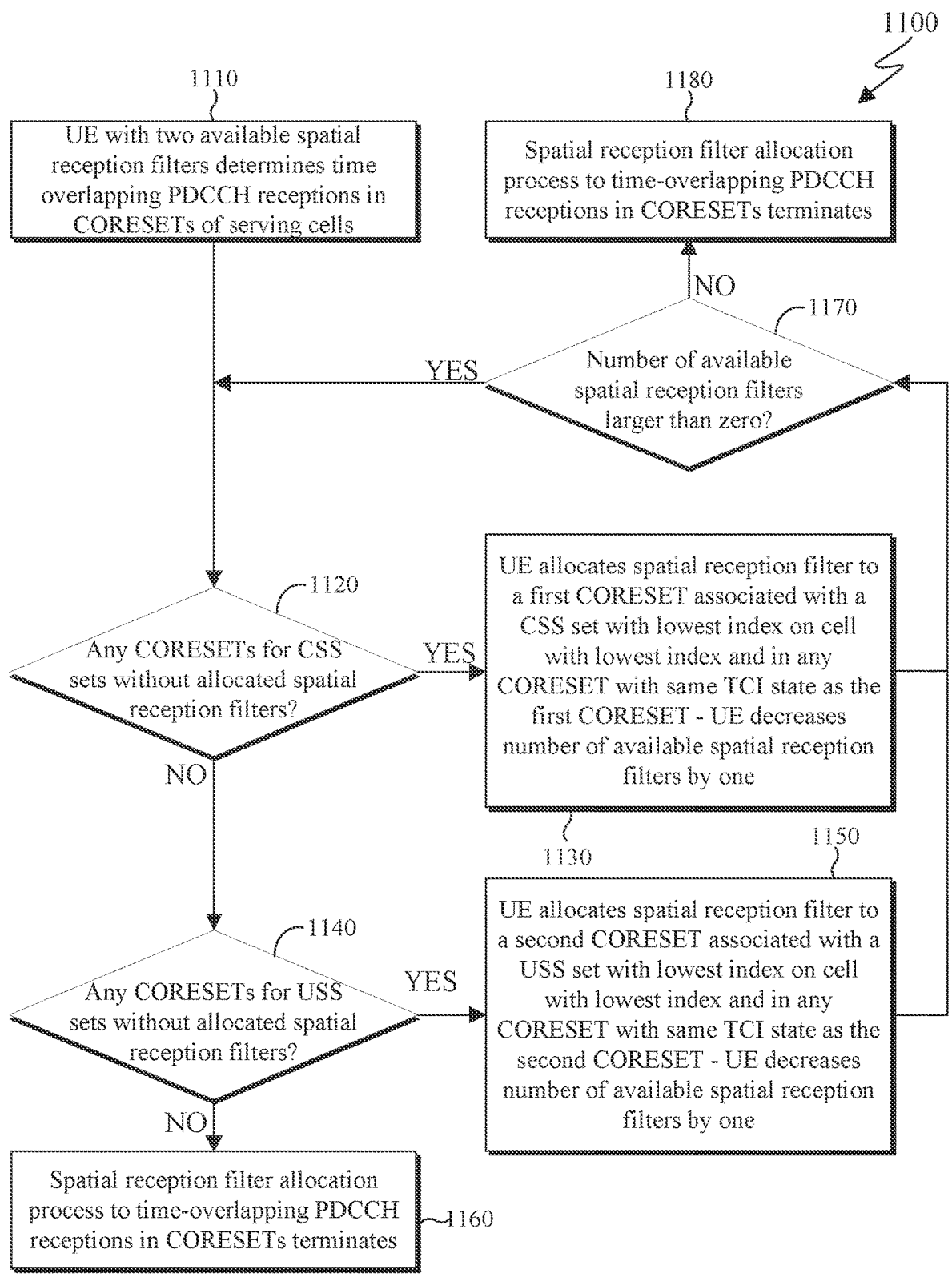
FIGS. 11 and 12 illustrates example methods for a UE, that can simultaneously receive with two spatial filters, to determine CORESETs with different quasi co-location (QCL) 'typeD' properties for monitoring PDCCH candidates in time overlapping PDCCH occasions according to embodiments of the present disclosure.
Figure 12:
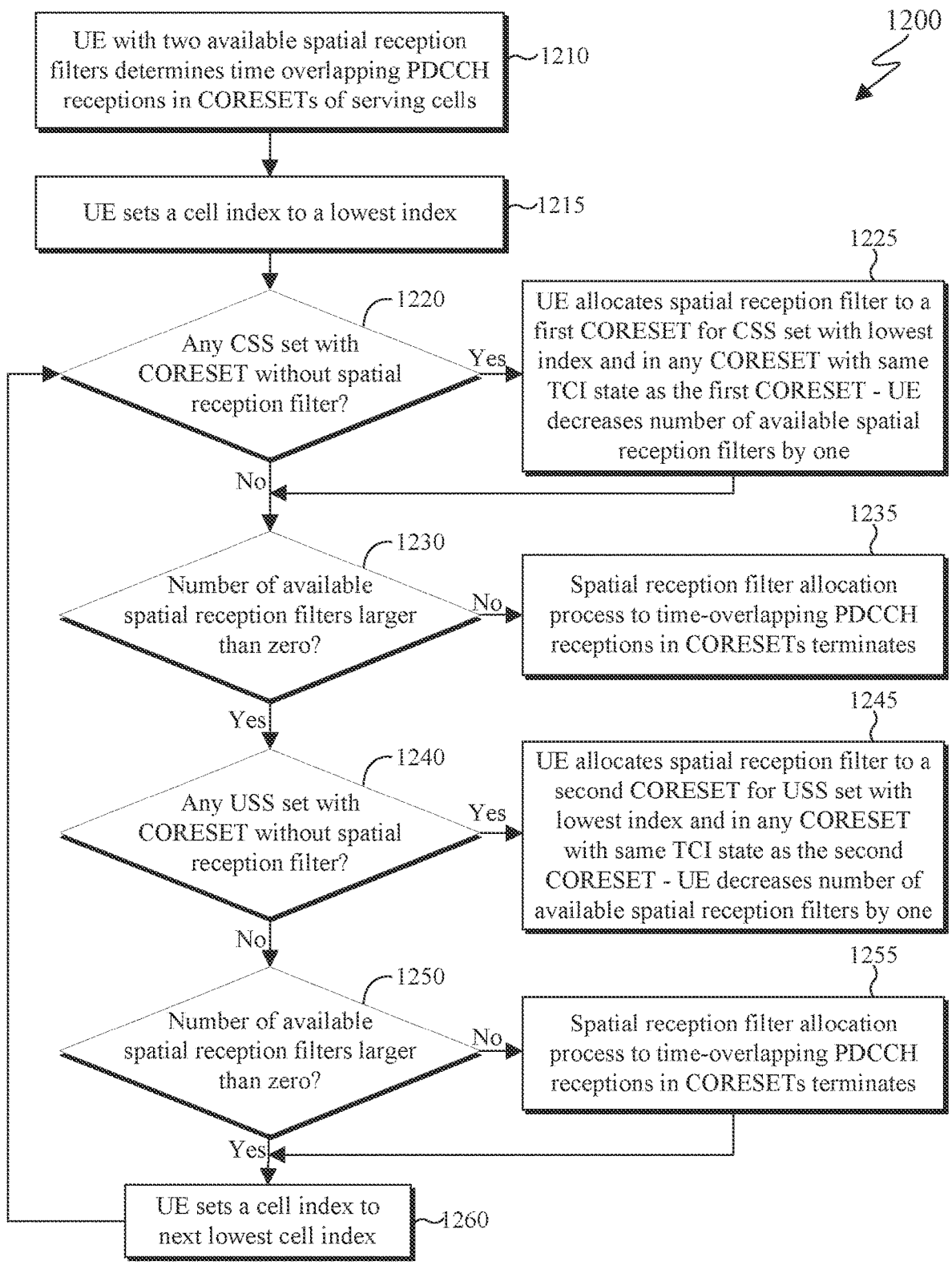

FIGS. 11 and 12 illustrates example methods 1100 and 1200 for a UE, that can simultaneously receive with two spatial filters, to determine CORESETs with different QCL 'typeD' properties for monitoring PDCCH candidates in time overlapping PDCCH occasions according to embodiments of the present disclosure. The steps of the method 1100 and the method 1200 can be performed by any of the UEs 111-119 of FIG. 1, such as the UE 116 of FIG. 3. The methods 1100 and 1200 are for illustration only and other embodiments can be used without departing from the scope of the present disclosure.

Embodiments of this disclosure also consider a procedure for a UE to determine CORESETs for simultaneous PDCCH receptions when the CORESETs are associated with different TCI states and the UE is capable for multiple simultaneous receptions with respective multiple spatial filters.

In certain embodiments, when the UE monitors PDCCH candidates in time overlapping PDCCH occasions in multiple CORESETs that have different TCI states and are associated with different spatial reception parameters, also referred to as QCL 'typeD' properties, the UE monitors PDCCHs only in CORESETs that have same 'typeD' properties as the CORESET corresponding to the CSS set with the lowest index in the cell with the lowest index containing CSS, if any; otherwise, to the USS set with the lowest index in the cell with lowest index. The indexes of CSS sets or USS sets are for corresponding sets with at least one PDCCH candidate in overlapping PDCCH monitoring occasions. For the purpose of determining the CORESET, a SS/PBCH block is considered to have different 'typeD' properties than a CSI-RS, and a first CSI-RS in a first cell and a second CSI-RS in a second cell that are associated with a same SS/PBCH block are assumed to have same 'typeD' properties. The allocation of non-overlapping CCEs and of PDCCH candidates for PDCCH monitoring is according to all search space sets associated with the multiple CORESETs on the active DL BWP(s) of the one or more cells and the number of active TCI states is determined from the multiple CORESETs.

A UE can report a capability for a number of spatial filters that the UE can use for simultaneous receptions. For example, the number of spatial filters can be one or two.

In a first approach, when a UE (such as the UE 116) reports a capability to use multiple spatial filters for time overlapping receptions and the UE monitors PDCCH candidates in time overlapping PDCCH occasions in multiple CORESETs that are associated with different spatial reception parameters (different TCI states with different QCL 'typeD' properties), the UE can allocate spatial filters for PDCCH receptions in CORESETs with different TCI states first in ascending order of a corresponding CSS set index, starting from a cell with lowest index, then in ascending order of a cell index, then in ascending order of a USS set index starting from a cell with lowest index, and then in ascending order of a cell index. The first approach prioritizes PDCCH monitoring for CSS sets across cells.

For example, upon satisfying four conditions, at the PDCCH monitoring occasion the UE receives PDCCHs, on any cell from the number of cells, according to any CSS set or USS set, from the number of CSS sets or USS sets, that is associated with a CORESET having the first TCI state or the second TCI state. In this example, the first condition specifies that a UE can support simultaneous receptions with two spatial filters. The second condition specifies that a first CSS set with index 0 for PDCCH monitoring on a cell with index 0 is associated with a first CORESET having a first TCI state and there is no CSS set that is not associated with the first TCI state on the cell with index 0. The third condition specifies that a second CSS set with index 1 for PDCCH monitoring on the cell with index 1 is associated with a second CORESET having a second TCI state (different from the first TCI state). The fourth condition specifies that at a PDCCH monitoring occasion, the UE is configured to receive PDCCHs according to a number of CSS sets or USS sets that include the first and second CSS sets and on a number of cells that include the cells with index 0 and index 1.

For another example, upon satisfying four conditions at the PDCCH monitoring occasion the UE receives PDCCHs, on any cell from the number of cells, according to the CSS set or any USS set, from the number of USS sets, that is associated with a CORESET having the first TCI state or the second TCI state. In this example, the first condition specifies that a UE can support simultaneous receptions with two spatial filters. The second condition specifies that a CSS set for PDCCH monitoring on a cell is associated with a first CORESET having a first TCI state. The third condition specifies that a first USS set with index 0 for PDCCH monitoring on a cell with index 0 is associated with a second CORESET having a second TCI state (different from the first TCI state). The fourth condition specifies that at a PDCCH monitoring occasion the UE is configured to receive PDCCHs only for CSS sets associated with CORESETs having the first TCI state and for USS sets that include the first USS set and on a number of cells that include the cell with index 0.

In a second approach, when a UE reports a capability to use multiple spatial filters for time overlapping receptions and the UE monitors PDCCH candidates in time overlapping PDCCH occasions in multiple CORESETs that are associated with different TCI states resulting to different spatial reception parameters (different QCL 'typeD' properties), the UE can allocate spatial filters for PDCCH receptions in CORESETs with different TCI states first in ascending order of a corresponding CSS set index, then in ascending order of a USS set index, starting from a cell with lowest index, and then in ascending order of a cell index. The second approach prioritizes PDCCH monitoring across search space sets, starting from CSS sets, in an ascending order of the cell index and increases a probability that a UE can be scheduled unicast traffic at a PDCCH monitoring occasion.

For another example, upon satisfying five conditions at the PDCCH monitoring occasion the UE receives PDCCHs, on any cell from the number of cells, according to any CSS set or any USS set, from the number of CSS sets or USS sets, that is associated with a CORESET having the first TCI state or the second TCI state. In this example, the first condition specifies that a UE can support simultaneous receptions with two spatial filters. The second condition specifies that a first CSS set for PDCCH monitoring on a cell with index 0 is associated with a first CORESET having a first TCI state. The third condition specifies that a first USS set for PDCCH monitoring on the cell with index 0 is associated with a second CORESET having a second TCI state (different from the first TCI state). The fourth condition specifies that a second CSS set for PDCCH monitoring on a cell with index 1 is associated with a third CORESET having a third TCI state. The fifth condition specifies that a PDCCH monitoring occasion the UE is configured to receive PDCCHs according to CSS sets and USS sets that include the first and second CSS sets and the first USS set and on a number of cells that include the cell with index 0 and the cell with index 1.

A UE (such as the UE 116) can also be configured by higher layer signaling from a serving gNB (such as the BS 102) whether to apply the first approach or the second approach for a determination of search space sets to monitor PDCCH at a PDCCH monitoring occasion. Further, for determining time-overlapping PDCCH receptions in CORESETs with different TCI states, a UE can also consider as part of the overlapping a time required for the UE to change a spatial filter for PDCCH reception from a first spatial filter associated with a first TCI state of a first CORESET to a second spatial filter associated with a second TCI state of a second CORESET.

The method 1100 as illustrated in FIG. 11 illustrates an example procedure for a first approach for a UE that can simultaneously receive with two spatial filters to determine CORESETs with different QCL 'typeD' properties for monitoring PDCCH candidates in time overlapping PDCCH.

In step 1110, a UE (such as the UE 116) with two available spatial reception filters for time-overlapping receptions determines time overlapping PDCCH receptions in CORESETs of serving cells. In step 1120, the UE determines whether there are any CORESETs associated with CSS sets that do not have allocated spatial reception filters on corresponding serving cells.

When there are CORESETs associated with CSS sets that do not have allocated spatial reception filters (as determined in step 1120), the UE in step 1130, allocates a spatial reception filter to a first CORESET. The first CORESET is associated with a CSS set with a lowest index, from the CSS sets, that has resources on a serving cell with a lowest index and to any other CORESET with a same TCI state as the first CORESET. The UE also decreases a number of available spatial reception filters by one.

Alternatively, when there are no CORESETs associated with CSS sets that do not have allocated spatial reception filters (as determined in step 1120), the UE in step 1140, determines whether there are any CORESETs associated with USS sets that do not have allocated spatial reception filters.

When there are CORESETs associated with USS sets that do not have allocated spatial reception filters on corresponding serving cells (as determined in step 1140), the UE in step 1150, allocates a spatial reception filter to a second CORESET associated with a USS set, from the USS sets, with a lowest index that has resources on a serving cell with a lowest index and to any other CORESET with a same TCI state as the second CORESET. The UE also decreases a number of available spatial reception filters by one.

Alternatively, when there are no CORESETs associated with USS sets that do not have allocated spatial reception filters on corresponding serving cells (as determined in step 1140), the spatial reception filter allocation process to time-overlapping PDCCH receptions in CORESETs terminates (step 1160).

After performing step 1130 or 1150, the UE determines whether a number of available spatial reception filters is larger than zero. When the number of available spatial reception filters is larger than zero (as determined in step 1170), the UE returns to step 1120. Alternatively, when the number of available spatial reception filters is not larger than zero (as determined in step 1170), the process terminates in step 1180.

The method 1200 as illustrated in FIG. 12 illustrates an example procedure for a second approach for a UE that can simultaneously receive with two spatial filters to determine CORESETs with different QCL 'typeD' properties for monitoring PDCCH candidates in time overlapping PDCCH.

In step 1210, a UE (such as the UE 116) with two available spatial reception filters for time-overlapping receptions determines time overlapping PDCCH receptions in CORESETs on serving cells. In Step 1215, the UE sets a serving cell to the one with a lowest index. In step 1220, the UE determines whether there are any CORESETs on the serving cell associated with CSS sets that do not have allocated spatial reception filters.

When there are CORESETs on the serving cell associated with CSS sets that do not have allocated spatial reception filters (as determined in step 1220), the UE in step 1225, allocates a spatial reception filter to a first CORESET associated with a CSS set with a lowest index, from the CSS sets, and to any other CORESET with a same TCI state as the first CORESET. The UE decreases a number of available spatial reception filters by one.

Alternatively, in step 1230, the UE determines whether a number of remaining spatial reception filters is larger than zero.

When the number of remaining spatial reception filters is not larger than zero (as determined in step 1230), the spatial reception filter allocation process to time-overlapping PDCCH receptions in CORESETs terminates (step 1235).

Alternatively, when there are no CORESETs on the serving cell associated with CSS sets that do not have allocated spatial reception filters (as determined in step 1230), the UE in step 1250, determines whether there are any CORESETs on the serving cell associated with USS sets that do not have allocated spatial reception filters.

When there are CORESETs on the serving cell associated with USS sets that do not have allocated spatial reception filters (as determined in step 1240), the UE in step 1245, allocates a spatial reception filter to a second CORESET associated with a USS set with a lowest index, from the USS sets, and to any other CORESET with a same TCI state as the second CORESET. Additionally, the UE decreases a number of available spatial reception filters by one.

Alternatively, in step 1250, the UE determines whether a number of remaining spatial reception filters is larger than zero. When the number of remaining spatial reception filters is not larger than zero (as determined in step 1250), the spatial reception filter allocation process to time-overlapping PDCCH receptions in CORESETs terminates (step 1255).

When there are no CORESETs on the serving cell associated with USS sets that do not have allocated spatial reception filters (as determined in step 1250), the UE in step 1260 sets a serving cell index to a next lowest serving cell index. Thereafter, the steps of the spatial reception filter allocation process to time-overlapping PDCCH receptions in CORESETs are repeated started from step 1220.

Although FIG. 11 illustrates the method 1100 and the FIG. 12 illustrates the method 1200 various changes may be made to FIGS. 11 and 12. For example, while the method 1100 and the method 1200 are shown as a series of steps, various steps could overlap, occur in parallel, occur in a different order, or occur multiple times. In another example, steps may be omitted or replaced by other steps. For example, steps of the method 1100 and the method 1200 can be executed in a different order.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method for a user equipment (UE), the method comprising:
   receiving information for first search space sets and for first control resource sets (CORESETs) on first cells, wherein a search space set has an index, is a common search space set (CSS set) or a UE-specific search space set (USS set), and is associated with a CORESET having an index and a transmission configuration indicator (TCI) state;
   determining second search space sets, from the first search space sets, associated with time-overlapping PDCCH receptions in second CORESETs, from the first CORESETs, on second cells from the first cells; and
   receiving physical downlink control channels (PDCCHs) according to CSS sets or USS sets, from the second search space sets, only in: (a) a first CORESET with a first TCI state, and (b) if any, a second CORESET with a second TCI state different than the first TCI state, and (c) in any other CORESET from the second CORESETs with a TCI state that is same as the first TCI state or as the second TCI state, wherein:
      the first CORESET corresponds to a first CSS set with a lowest index on a first cell with a lowest index from the second cells, if any; otherwise, to a first USS set with a lowest index on the first cell with the lowest index from the second cells, and
      excluding CSS sets and USS sets associated with CORESETs having the first TCI state, the second CORESET corresponds to a second CSS set with a lowest index on a second cell with a lowest index from the second cells, if any; otherwise, to a second USS set with a lowest index in the second cell with the lowest index from the second cells.

2. The method of claim 1, further comprising determining that PDCCH receptions in CORESETs with different TCI states are time-overlapping when a time difference between an end of any PDCCH reception in CORESETs with the first TCI state or the second TCI state and a start of any PDCCH reception in CORESETs with the second TCI state or the first TCI state, respectively, is less than a predetermined positive value.

3. The method of claim 1, further comprising transmitting information of a capability for simultaneous PDCCH receptions in a first CORESET with a first TCI state and in a second CORESET with a second TCI state that is different than the first TCI state.

4. The method of claim 1, further comprising:
   receiving two channel state information reference signals (CSI-RSs); and
   transmitting a channel with two channel state information (CSI) reports corresponding to the two CSI-RSs, wherein:
      a PDCCH from the PDCCHs provides a downlink control information (DCI) format, and
      the DCI format triggers reception of the two CSI-RSs.

5. The method of claim 4, wherein the two CSI-RSs have different TCI states.

6. The method of claim 4, wherein:
   the channel is transmitted with repetitions, and
   the two CSI reports are included in an earliest repetition that starts after an end of reception of the PDCCH by a time that is larger than or equal to a first value.

7. The method of claim 1, further comprising:
   receiving two channel state information reference signals (CSI-RSs) on a cell; and
   transmitting a channel with two channel state information (CSI) reports corresponding to the two CSI-RSs, wherein:
      a PDCCH from the PDCCHs provides a downlink control information (DCI) format, and
      the DCI format triggers reception of the two CSI-RSs.

8. A user equipment (UE) comprising:
   a transceiver configured to receive information for first search space sets and for first control resource sets (CORESETs) on first cells, wherein a search space set has an index, is a common search space set (CSS set) or a UE-specific search space set (USS set), and is associated with a CORESET having an index and a transmission configuration indicator (TCI) state; and
   a processor operably coupled to the transceiver, the processor configured to determine second search space sets, from the first search space sets, associated with time-overlapping receptions of physical downlink control channels (PDCCHs) in second CORESETs, from the first CORESETs, on second cells from the first cells,
   wherein the transceiver is further configured to receive PDCCHs according to CSS sets or USS sets, from the second search space sets, only in: (a) a first CORESET with a first TCI state, and (b) if any, a second CORESET with a second TCI state different than the first TCI state, and (c) in any other CORESET from the second CORESETs with a TCI state that is same as the first TCI state or as the second TCI state, wherein:
      the first CORESET corresponds to a first CSS set with a lowest index on a first cell with a lowest index from the second cells, if any; otherwise, to a first USS set with a lowest index on the first cell with the lowest index from the second cells, and
      excluding CSS sets and USS sets associated with CORESETs having the first TCI state, the second CORESET corresponds to a second CSS set with a lowest index on a second cell with a lowest index from the second cells, if any; otherwise, to a second USS set with a lowest index in the second cell with the lowest index from the second cells.

9. The UE of claim 8, wherein the processor is further configured to determine that PDCCH receptions in CORESETs with different TCI states are time-overlapping when a time difference between an end of any PDCCH reception in CORESETs with the first TCI state or the second TCI state and a start of any PDCCH reception in CORESETs with the second TCI state or the first TCI state, respectively, is less than a predetermined positive value.

10. The UE of claim 8, wherein the transceiver is further configured to transmit information of a capability for simultaneous PDCCH receptions in a first CORESET with a first TCI state and in a second CORESET with a second TCI state that is different than the first TCI state.

11. The UE of claim 8, wherein the transceiver is further configured to:
   receive two channel state information reference signals (CSI-RSs); and
   transmit a channel with two channel state information (CSI) reports corresponding to the two CSI-RSs, wherein:
      a PDCCH from the PDCCHs provides a downlink control information (DCI) format, and
      the DCI format triggers reception of the two CSI-RSs.

12. The UE of claim 11, wherein the two CSI-RSs have different TCI states.

13. The UE of claim 11, wherein:
the transceiver is further configured to transmit the channel with repetitions; and
the processor is further configured to determine an earliest repetition that starts after an end of reception of the PDCCH by a time that is larger than or equal to a first value, wherein the two CSI reports are included only in the earliest repetition.

14. The UE of claim 11, wherein the transceiver is further configured to:
receive two channel state information reference signals (CSI-RSs) on a cell; and
transmit a channel with two channel state information (CSI) reports corresponding to the two CSI-RSs, wherein:
a PDCCH from the PDCCHs provides a downlink control information (DCI) format, and
the DCI format triggers reception of the two CSI-RSs.

15. A base station comprising:
a transceiver configured to transmit information for first search space sets and for first control resource sets (CORESETs) on first cells, wherein a search space set has an index, is a common search space set (CSS set) or a UE-specific search space set (USS set), and is associated with a CORESET having an index and a transmission configuration indicator (TCI) state; and
a processor operably coupled to the transceiver, the processor configured to determine second search space sets, from the first search space sets, associated with time-overlapping receptions of physical downlink control channels (PDCCHs) in second CORESETs, from the first CORESETs, on second cells from the first cells,
wherein the transceiver is further configured to transmit PDCCHs according to CSS sets or USS sets, from the second search space sets, only in: (a) a first CORESET with a first TCI state, and (b) if any, a second CORESET with a second TCI state different than the first TCI state, and (c) in any other CORESET from the second CORESETs with a TCI state that is same as the first TCI state or as the second TCI state, wherein:
the first CORESET corresponds to a first CSS set with a lowest index on a first cell with a lowest index from the second cells, if any; otherwise, to a first USS set with a lowest index on the first cell with the lowest index from the second cells, and
excluding CSS sets and USS sets associated with CORESETs having the first TCI state, the second CORESET corresponds to a second CSS set with a lowest index on a second cell with a lowest index from the second cells, if any; otherwise, to a second USS set with a lowest index in the second cell with the lowest index from the second cells.

16. The base station of claim 15, wherein the processor is further configured to determine that PDCCH transmissions in CORESETs with different TCI states are time-overlapping when a time difference between an end of any PDCCH transmission in CORESETs with the first TCI state or the second TCI state and a start of any PDCCH transmission in CORESETs with the second TCI state or the first TCI state, respectively, is less than a predetermined positive value.

17. The base station of claim 15, wherein the transceiver is further configured to receive information of a capability for simultaneous PDCCH transmissions in a first CORESET with a first TCI state and in a second CORESET with a second TCI state that is different than the first TCI state.

18. The base station of claim 15, wherein the transceiver is further configured to:
transmit two channel state information reference signals (CSI-RSs), and
receive a channel with two channel state information (CSI) reports corresponding to the two CSI-RSs, wherein:
a PDCCH from the PDCCHs provides a downlink control information (DCI) format, and
the DCI format triggers transmission of the two CSI-RSs.

19. The base station of claim 18, wherein the two CSI-RSs have different TCI states.

20. The base station of claim 18, wherein:
the transceiver is further configured to receive the channel with repetitions; and
the processor is further configured to determine an earliest repetition that starts after an end of transmission of the PDCCH by a time that is larger than or equal to a first value, wherein the two CSI reports are included only in the earliest repetition.

* * * * *